United States Patent
Hanyu et al.

(10) Patent No.: US 9,583,750 B2
(45) Date of Patent: Feb. 28, 2017

(54) SECONDARY BATTERY

(75) Inventors: Yuki Hanyu, Sendai (JP); Itaru Honma, Sendai (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 167 days.

(21) Appl. No.: 14/349,444

(22) PCT Filed: Jun. 11, 2012

(86) PCT No.: PCT/JP2012/064947
§ 371 (c)(1),
(2), (4) Date: Jul. 31, 2014

(87) PCT Pub. No.: WO2013/051308
PCT Pub. Date: Apr. 11, 2013

(65) Prior Publication Data
US 2014/0377621 A1    Dec. 25, 2014

(30) Foreign Application Priority Data

Oct. 5, 2011 (JP) ................................. 2011-220820
Mar. 26, 2012 (JP) .................... PCT/JP2012/057752

(51) Int. Cl.
H01M 2/14    (2006.01)
H01M 2/18    (2006.01)
(Continued)

(52) U.S. Cl.
CPC ........... H01M 2/16 (2013.01); H01M 2/1653 (2013.01); H01M 4/136 (2013.01);
(Continued)

(58) Field of Classification Search
CPC ....... H01M 2/14; H01M 10/0562; H01M 6/18
(Continued)

(56) References Cited

U.S. PATENT DOCUMENTS 5,665,492 A * 9/1997 Sotomura ............. H01M 4/137
427/58
5,888,666 A * 3/1999 Kawakami ............. H01M 2/16
429/145
(Continued)

FOREIGN PATENT DOCUMENTS

JP    06-056989 A    3/1994
JP    07-134987 A    5/1995
(Continued)

OTHER PUBLICATIONS

Yao, M. et al., "High-capacity organic positive-electrode material based in benzoquinone derivative for use in rechargeable lithium batteries", Journal of Power Sources, 195(2010) vol. 1, pp. 8336-8340.

(Continued)

*Primary Examiner* — Patrick Ryan
*Assistant Examiner* — Julian Anthony
(74) *Attorney, Agent, or Firm* — Westerman, Hattori, Daniels & Adrian, LLP

(57) ABSTRACT

A secondary battery charged and discharged even after dissolution. The active material in the cathode body and/or the anode body is a liquid, or the active material undergoes phase transition into a liquid is provided. The secondary battery (1) includes: a cathode collector (2), a cathode body (3), a solid electrolyte (4), an anode body (5), and an anode collector (6). The cathode body and the anode body are sealed by the solid electrolyte, the cathode collector, and/or the anode collector. The cathode body and the anode body preferably contain an active material that undergoes phase transition from a solid to a liquid, or to a phase containing a liquid, due to charge and discharge. The cathode body or the anode body preferably contains a liquid active material.

(Continued)

A polymeric layer may be inserted between the cathode body and/or the anode body and the solid electrolyte.

35 Claims, 55 Drawing Sheets

(51) Int. Cl.

| | | |
|---|---|---|
| *H01M 6/18* | (2006.01) | |
| *H01M 10/0562* | (2010.01) | |
| *H01M 2/16* | (2006.01) | |
| *H01M 10/052* | (2010.01) | |
| *H01M 4/136* | (2010.01) | |
| *H01M 4/58* | (2010.01) | |
| *H01M 4/60* | (2006.01) | |
| *H01M 4/62* | (2006.01) | |
| *H01M 10/056* | (2010.01) | |
| *H01M 4/02* | (2006.01) | |

(52) U.S. Cl.
CPC ......... *H01M 4/5815* (2013.01); *H01M 4/602* (2013.01); *H01M 4/622* (2013.01); *H01M 10/052* (2013.01); *H01M 10/056* (2013.01); *H01M 10/0562* (2013.01); *H01M 2004/023* (2013.01); *H01M 2220/30* (2013.01); *H01M 2300/0045* (2013.01); *H01M 2300/0065* (2013.01); *Y02E 60/122* (2013.01); *Y02P 70/54* (2015.11)

(58) Field of Classification Search
USPC .................................. 429/131, 132, 306, 307
See application file for complete search history.

(56) References Cited

U.S. PATENT DOCUMENTS

| | | | |
|---|---|---|---|
| 6,753,114 B2* | 6/2004 | Jacobs ................ | H01M 2/1653 429/304 |
| 2004/0053123 A1* | 3/2004 | Chang ................ | H01M 2/1673 429/144 |
| 2004/0058246 A1* | 3/2004 | Choi ..................... | H01M 4/136 429/232 |
| 2014/0004429 A1* | 1/2014 | Nakanishi ............. | H01M 12/08 429/403 |

FOREIGN PATENT DOCUMENTS

| | | | |
|---|---|---|---|
| JP | 10-154512 A | 6/1998 | |
| JP | 11-003708 A | 1/1999 | |
| JP | 2001-023695 A | 1/2001 | |
| JP | 2006-324179 A | 11/2006 | |
| JP | 2008-091343 A | 4/2008 | |
| JP | 2008-147015 * | 6/2008 | ............. H01M 4/60 |
| JP | 2009-181872 A | 8/2009 | |
| JP | 2009-259755 A | 11/2009 | |
| JP | 2010-238811 A | 10/2010 | |
| JP | 2010-257689 A | 11/2010 | |
| JP | 2011-026153 A | 2/2011 | |
| WO | 2011/077939 A1 | 6/2011 | |

OTHER PUBLICATIONS

Chen, H. et al., "From Biomass to a Renewable LixC6O6 Organic Electrode for Sustainable Li-Ion Batteries", ChemSusChem, 2008, 1, pp. 348-355.

Park, S. et al., "Chemical methods for the production of graphenes", Nature Nanotechnology, vol. 4, Apr. 2009, pp. 217-224.

* cited by examiner

FIG.28
(A) 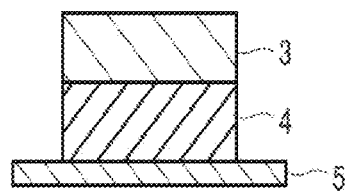
(B) 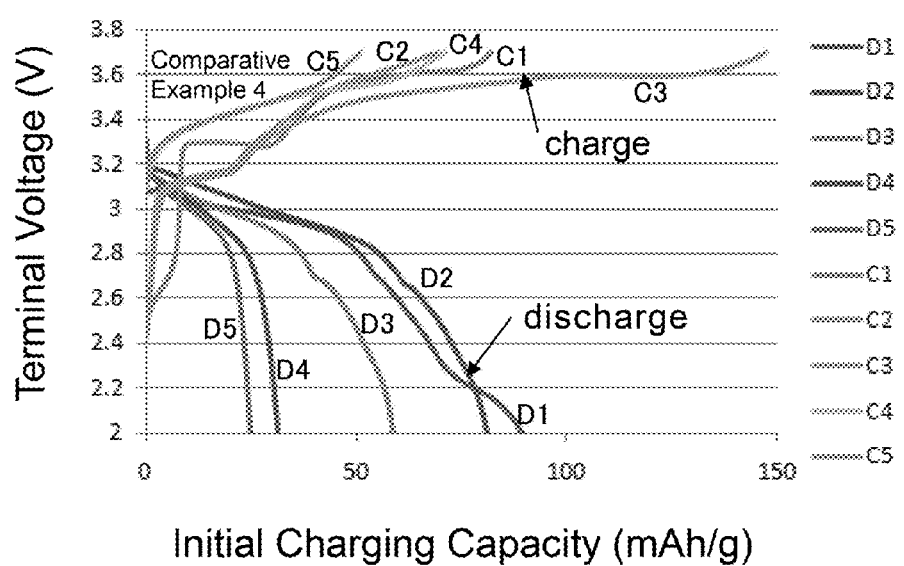

FIG.30
(A)
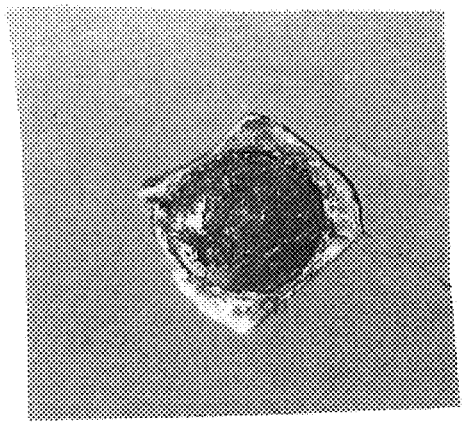
(B)
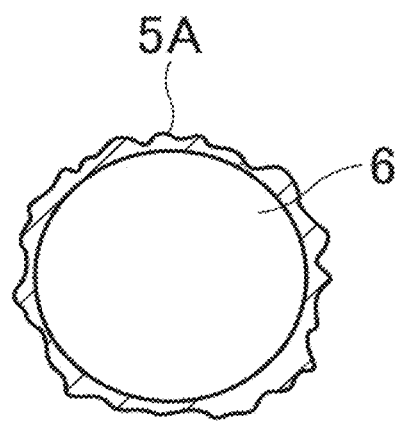

FIG.53 Example 23

SECONDARY BATTERY

TECHNICAL FIELD

The present invention relates to a secondary battery. More specifically, the present invention relates to the secondary battery sealing an active material that undergoes phase transition from a solid to a liquid, or to a phase containing a liquid, by charge and discharge.

BACKGROUND ART

Many of organic cathode body materials in a secondary battery have potential versus $Li/Li^+$ of 2.0 to 3.5 V, which is lower than the potential of cathode bodies such as $LiCoO_2$, but high energy density ensuring charging-discharging capacity of 400 to 600 mAh/g can be expected because the organic cathode body causes a plurality of electron reactions to occur.

Organic materials are low-cost and resource-saving materials unlike lithium (Li) and cobalt (Co), which are distributed unevenly. Organic materials also have advantages that design can be selected to suite intended purposes by molecular design, and that safety is ensured because activity is lost before thermal runaway occurs. As organic cathode materials, various chemical compounds have been proposed.

Patent Literatures 1 and 2 disclose organic materials having a quinone functional group as organic cathode body materials.

Patent Literatures 3 and 4 disclose organic materials called tetracyanoquinodimethane (TCNQ) and tetracyanoethylene (TCNE).

Use of organic cathode body materials for in-vehicle storage batteries and for large storage batteries for smart grids has been studied. However, organic cathode body materials have yet to be put into practical use because an irreversible secondary reaction occurs due to the radical of reaction intermediate, significant degradation occurs with the increase in the number of charging-discharging cycles due to dissolution of active material into electrolyte, and for other reasons (Non-Patent Literature 1).

CITATION LIST

Patent Literature

Patent Literature 1: JP 1994-560989 A
Patent Literature 2: JP 1998-154512 A
Patent Literature 3: JP 1995-134987 A
Patent Literature 4: JP 1999-3708 A

Non-Patent Literature

Non-Patent Literature 1: Yao, M. et al., Journal of Power Sources, Vol. 195, pp. 8336-8340, 2010
Non-Patent Literature 2: Chen, H. et al., ChemSusChem, pp. 348-355, 2008
Non-Patent Literature 3: S. Park, and R. S. Ruoff, Nature Nanotechnology, Vol. 4, pp. 217-224, 2009

SUMMARY OF INVENTION

Technical Problem

It is known that some of the molecular species such as tetracyanoquinodimethane (TCNQ) etc., which are the organic materials, have a stable intermediate, and consequently allow reversible charge and discharge to occur. However, problems of dissolution and resulting degradation have yet to be solved.

In view of the above problems, the object of the present invention is to provide a secondary battery which is unsusceptible to degradation and thus can be charged and discharged even after dissolution, because the active material in the cathode body and/or the anode body is a liquid, or because the active material undergoes phase transition into a liquid phase.

Solution to Problem

The inventors et al. examined the dissolution of the cathode body material that occurs when an organic cathode body material is used for an all-solid battery, and conducted various experiments by using a stable, large-capacity, and inexpensive quinone active material, etc. as cathode body materials and a composite of an ionic liquid and silica as a solid electrolyte. The present inventors have thought upon the present invention discovering that the inventors et al. fabricated the all-solid battery made entirely of solid materials and having an approximately 300-μm bulk organic cathode body material, which can be used for large cells, and as a result, succeeded in improving the charging-discharging capacity and cycle characteristics compared to those of the conventional organic cathode body materials.

To solve the above problem, the present invention provides a secondary battery comprising: a cathode collector; a cathode body; a solid electrolyte containing a supporting agent; an anode body; an anode collector; and a polymeric layer inserted between the cathode body and/or the anode body and the solid electrolyte, wherein the cathode body and/or the anode body is/are sealed by the solid electrolyte, the polymeric layer, the cathode collector and/or the anode collector.

In the above configuration, the cathode body and/or the anode body may preferably contain an active material that undergoes phase transition from a solid to a liquid, or to a phase containing a liquid, due to charge and discharge. The cathode body and/or the anode body may preferably contain/contains a liquid active material.

The polymeric layer is preferably made of a material different from the supporting material. The active material is sulfur, at least one of organic molecule, or a mixture of sulfur and at least one of organic molecule.

The solid electrolyte may preferably have a lithium (Li) ion conductivity. The solid electrolyte may preferably comprise the supporting agent and an ionic liquid containing lithium (Li) ions. The solid electrolyte may further preferably contain a liquid electrolyte layer.

The ionic liquid is preferably any one of TFSA, FSA, molten salt, organic electrolyte, and aqueous electrolyte, or is made of two or more of these substances.

The supporting agent is preferably metal oxide particles of any one of $SiO_2$, $ZrO_2$, $Al_2O_3$, $TiO_2$, $CeO_2$, $Li_3PO_4$, and $LiLaTiO_3$. The ionic liquid is EMI-TFSA or BMP-TFSA.

The active material is TCNQ, the ionic liquid is EMI-TFSA or BMP-TFSA, and the organic electrolyte is any one of EC, DEC, and PC, or is made of two or more of these substances.

The anode body is preferably any one of carbon (C), lithium (Li), sodium (Na), magnesium (Mg), calcium (Ca), aluminum (Al), zinc (Zn), indium (In), tin (Sn), and silicon (Si).

Advantageous Effects of Invention

According to the secondary battery of the present invention, since the cathode body and/or anode body are/is sealed by the solid electrolyte, cathode collector and/or anode collector, the initial discharge capacity accounting for 70% to 100% of the theoretical value can be achieved, and at the same time, a low-cost all-solid battery unsusceptible to degradation can be provided.

BRIEF DESCRIPTION OF DRAWINGS

FIG. 28(A) is a schematic cross-sectional view of the battery in Comparative Example 4, and (B) is a chart showing the charging-discharging characteristics in Comparative Example 4.

FIG. 30 is an optical image of a disassembled secondary battery with degraded characteristics, where (A) is the optical image, and (B) is a schematic view explaining (A).

Figure 1:
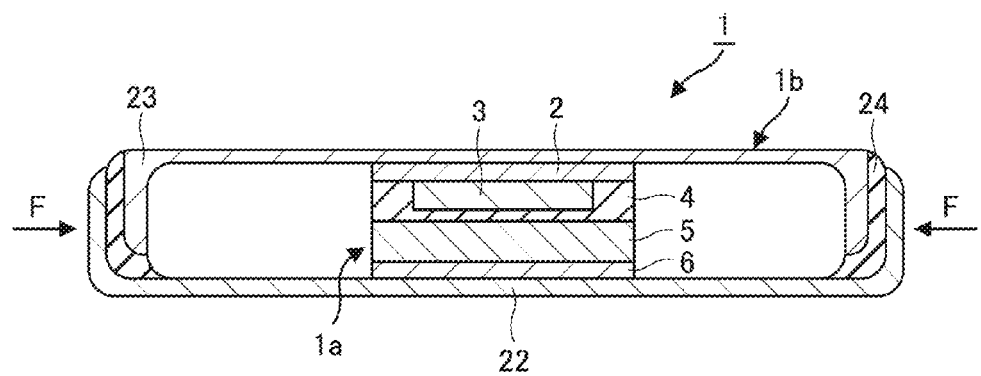
FIG. 1 is a cross-sectional view illustrating the structure of a secondary battery of the present invention.

REFERENCE SIGNS LIST 1, 10, 15, 20, 25, 30, 40, 50: Secondary battery
2: Cathode collector
3, 13: Cathode body
4, 14: Solid electrolyte
5, 15: Anode body
5A: Region of a material having leaked from the active material of cathode body
6, 16: Anode collector
8: Liquid electrolyte
13A: Convex portion
13B: Concave portion
22: Anode can
23: Cathode cap
24: Insulating gasket
36: Polymeric layer
53: Liquid active material
54: Liquid active material inflow port
55: Liquid active material outflow port

DESCRIPTION OF EMBODIMENTS

The embodiments of the present invention will hereinafter be described by referring to drawings.

FIG. 1 is a cross-sectional view showing the structure of a secondary battery 1 of the present invention. As shown in FIG. 1, the main unit 1a of the secondary battery 1 of the present invention is sealed by a case 1b, and the main unit 1a is in a laminated structure where a cathode collector 2, a cathode body 3, a solid electrolyte 4, an anode body 5, and an anode collector 6 are stacked. In this embodiment, the side faces and the bottom face of the cathode body 3, excluding the top face, are embedded in the solid electrolyte 4, and the top face of the cathode body 3 is covered by the cathode collector 2.

The cathode collector 2 and the cathode body 3 together form a cathode. The anode collector 6 and the anode body 5 together form an anode. The cathode collector 2 on the side of the cathode body 3 and the anode collector 6 on the side of the anode body 5 are electrodes made of a conductive material, and they may also be used as a cover for sealing the secondary battery 1. When the anode body 5 is made of a conductive material such as metallic Li, it is also allowed to function as the anode collector 6. The cathode body 3 made of an active material, etc. to be described later is embedded in the solid electrolyte 4 as described previously, and the top surface of the cathode body 3 is covered by the cathode collector 2. In other words, the cathode body 3 of the secondary battery 1 has a structure enclosed and sealed by the solid electrolyte 4 and the collector.

The cathode body 3 is made of materials including: an active material that undergoes phase transition from a solid to a liquid, or to a phase containing a liquid, as a result of charge and discharge of the secondary battery; a conductivity aid; and a binding agent. The active material is sulfur (S), at least one of organic molecule, or a mixture of sulfur (S) and at least one of organic molecule.

Now, the reason why the active material in the cathode body 3 undergoes phase transition from a solid to a liquid, or to a phase containing a liquid due to charge and discharge of the secondary battery, will hereinafter be described.

The active material in the cathode body 3 is reduced by charging, receives electrons, and turns into negative ions. Melting occurs to the negative ions, namely phase transition occurs from a solid to a liquid, or since negative ions are soluble in the electrolyte, phase transition occurs from a solid to a phase containing a liquid.

As the active material for the cathode body 3, an organic material that includes a quinone material and shows reversible oxidation-reduction reaction (also referred to as redox reaction), such as 2,3-dichloro-5,6-dicyano-p-benzoquinone (DDQ), 7,7,8,8-tetracyanoquinodimethane (TCNQ), tetrahydroxybenzoquinone (THBQ), dimethoxybenzoquinone (DMTBQ), and rubeanic acid, can be used. The cathode body 3 includes: the active material, which is any one of DDQ, TCNQ, THBQ, DMTBQ, and rubeanic acid or a combination of two or more of these materials; the conductivity aid; and the binding agent.

The cathode body 3 of the present invention may be formed by the active material, the conductivity aid, and the binding agent, and may be embedded in the solid electrolyte 4 as shown in FIG. 1. The conductivity aid is added to increase conductivity, and acetylene black (hereinafter referred to as AB), etc. can be used. The binding agent is a material used to form the active material and the conductivity aid in the cathode body 3 into a layer, and fluorocarbon resin, etc. can be used. The fluorocarbon resin includes polytetrafluoroethylene (PTFE).

As the active material for the cathode body 3, a material obtained by adding an inorganic material such as sulfur (S) to the above-mentioned organic material may also be used. By adding S, the effect of increasing charging-discharging capacity (mAh/g) is ensured. Organic materials to which S is added include TCNQ, polyaniline, THBQ, and poly 3,4-ethylene dioxythiophene (PEDOT).

As the cathode body 3 of the present invention, a bulk material having the thickness of approximately 100 μm or more may also be used.

As the solid electrolyte 4, a composite material consisting of metal oxide particles, which function as a supporting agent, and an ionic liquid can be used. As the supporting agent, silica ($SiO_2$) can be used. As silica particles, so-called fumed silica can be used. As supporting agents other than $SiO_2$, any one of $ZrO_2$, $Al_2O_3$, $TiO_2$, $CeO_2$, $Li_3PO_4$, and $LiLaTiO_3$ may be used. An insulating material used as the supporting agent such as silica ($SiO_2$) has a function of a separator to prevent short circuit between the cathode and the anode.

As an ionic liquid, any one of 1-ethyl-3-methylimidazolium-bis(trifluoromethylsulfonyl)imide (commonly called EMI-TFSA), lithium-bis(trifluoromethylsulfonyl)imide (commonly called Li-TFSA), TFSA, FSA, molten salt, organic electrolyte, and aqueous electrolyte can be used. As FSA, an ionic liquid such as 1-ethyl-3-methylimidazolium-bis(fluorosulfonyl)imide (commonly called EMI-FSA) can be used. As the organic electrolyte, ethylene carbonate (EC), diethylene carbonate (DEC), and propylene carbonate (PC) to be described later can be used. As the organic electrolyte, any one of EC, DEC, and PC, or two or more of these may be used in combination.

The solid electrolyte 4 can be prepared by mixing fumed silica and 1 mol (M) EMI-TFSA solution of Li-TFSA in methanol at the volume ratio of 1:3, agitating the solution, and then by evaporating the methanol. Furthermore, to the solid electrolyte 4, an organic electrolyte may be added as an additive. The organic electrolyte to be added to the solid electrolyte 4 can be selected depending on the active material for the cathode body 3. By adding the organic electrolyte to the solid electrolyte 4, the charging-discharging characteristics of the secondary battery 1 can be improved. In particular, when the active material for the cathode body 3 is TCNQ, by further adding EC/DEC as the additive, the charging-discharging characteristics can be improved significantly. In other words, the secondary battery 1 unsusceptible to degradation even if charge and discharge is repeated can be obtained. Furthermore, as the organic electrolyte, any one of EC, DEC, and PC, or two or more of these may be used in combination.

The covering member on the side of the cathode collector 2, cathode body 3, and solid electrolyte 4 may be formed by the integral molding.

It is only necessary that the material for the anode body 5 is a solid material that can form the secondary battery 1, and a carbon electrode, or any one of metallic Li, Na, Mg, Ca, Al, Zn, In, Sn, and Si can be used. When the anode body 5 is made of a fairly conductive material, it may also be used as the anode collector 6, and as a cover for sealing the secondary battery 1.

The case 1b of the secondary battery 1 according to this embodiment includes: an anode can 22 on which the main unit 1a is placed; a cathode cap 23; and an insulating gasket 24. The insulating gasket 24 is inserted between the anode can 22 and the cathode cap 23. The insulating gasket 24 has a function of insulating the anode can 22 and the cathode cap 23, and at the same time, maintaining air-tightness and water-tightness to prevent them from contacting the air around the case or moisture contained in the air. As the insulating gasket 24, a ring-shaped rubber gasket can be used. The rubber materials include natural rubber, chloroprene rubber, nitrile rubber, ethylene-propylene rubber, butyl rubber, silicone rubber, fluoro rubber, and perfluoro rubber. The anode can 22 and the cathode cap 23 are inserted into a jig that can apply pressure, and by fastening the anode can 22 from its side in the direction of the arrow (F) in an atmosphere of inert gas such as argon (Ar) gas, they are sealed via the insulating gasket 24.

The secondary battery 1 of the present invention is an all-solid battery including a bulk-state cathode body 3 and the solid electrolyte 4 made of the composite material containing the supporting agent such as silica and Li ions. The battery allows 70% to 100% of the theoretical initial charging capacity to be obtained. At the same time, the low-cost all-solid battery unsusceptible to degradation can be provided.

Various modifications to the secondary battery of the present invention are allowed depending on the shape of the cathode body 3 and the anode body 5. Examples of modification will be described by referring to FIG. 2 to FIG. 8.

Modification 1

Figure 2:
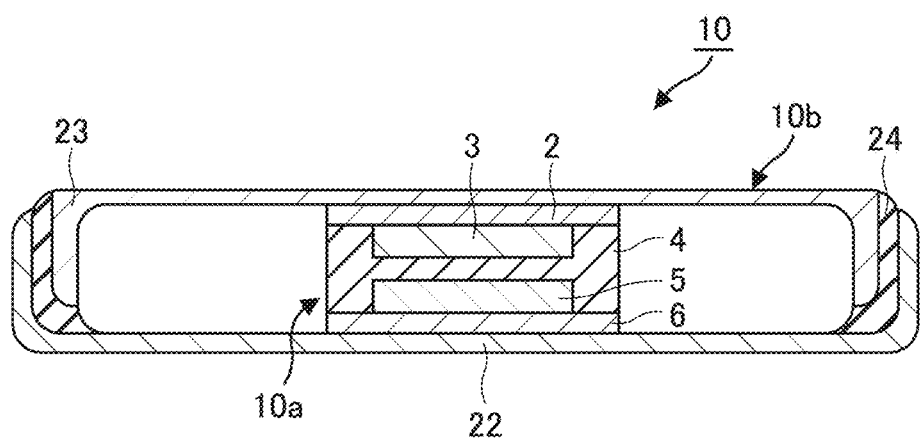
FIG. 2 is a cross-sectional view illustrating modification 1 of a secondary battery of the present invention.

FIG. 2 is a cross-sectional view illustrating the modification 1 of a secondary battery of the present invention. This secondary battery 10 is in a structure where the main unit 10a, which is formed by laminating, from the bottom in the figure, including: an anode collector 6; an anode body 5; a solid electrolyte 4; a cathode body 3; and a cathode collector 2 in this order, is sealed by a case 10b. The secondary battery 10 as shown in FIG. 2 differs from the secondary battery 1 as shown in FIG. 1 in that the cathode body 3 is formed in laminated state, that the anode body 5 is embedded in the solid electrolyte 4 except for its bottom, and that the bottom face of the anode body 5 is covered by the anode collector 6. In other words, the cathode body 3 and the anode body 5 of the secondary battery are sealed by the solid electrolyte 4, cathode collector 2, and anode collector 6. The anode body 5 is made of a material containing an active material that undergoes phase transition from a solid to a liquid, or to a phase containing a liquid, due to charge and discharge, or a material to be described later. With this secondary battery 10, since the anode body 5 is also embedded in the solid electrolyte 4, degradation of charging-discharging characteristics can be decreased.

Since the case 10b is in a similar structure as the case 1b of the secondary batter 1, its description will be omitted.

Modification 2

Figure 3:
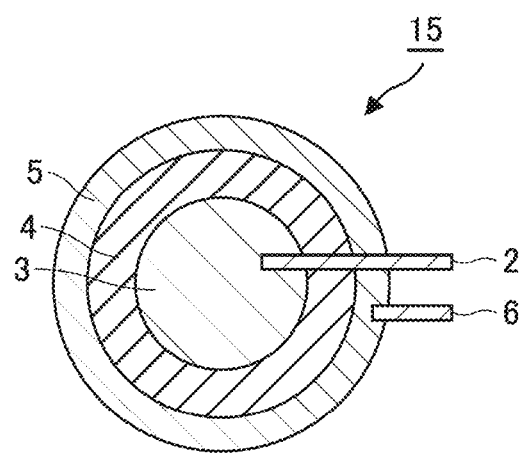
FIG. 3 is a cross-sectional view illustrating modification 2 of a secondary battery of the present invention.

FIG. 3 is a cross-sectional view showing the modification 2 of a secondary battery of the present invention. This secondary battery 15 is in a spherical shape. This secondary battery 15 includes: a spherical cathode body 3 disposed at the center; a solid electrolyte 4 that covers the cathode body 3; an anode body 5 that covers the solid electrolyte 4; an anode collector 6 that is connected to the anode body 5 and pulled out to outside; and a cathode collector 2 that is connected to the cathode body 3 and pulled out to outside. The cathode collector 2 is pulled out to outside in a state insulated from the solid electrolyte 4, anode body 5, and anode collector 6. According to this secondary battery 15, since the secondary battery 15 can be made to have a larger volume than that of the coin-shaped secondary battery 1 as shown in FIG. 1 easily, a large-capacity secondary battery can be achieved.

Modification 3

Figure 4:
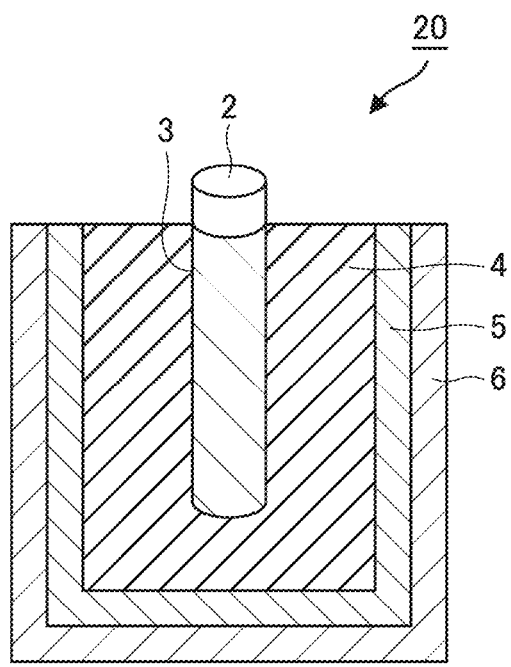
FIG. 4 is a cross-sectional view illustrating modification 3 of a secondary battery of the present invention.

FIG. 4 is a cross-sectional view showing the modification 3 of a secondary battery of the present invention. This secondary battery 20 is in a cylindrical shape. This secondary battery 20 includes: a columnar cathode body 3 disposed at the center; a cylindrical solid electrolyte 4 that covers this cathode body 3 except for its top; an anode body 5 that covers this cylindrical solid electrolyte 4; an anode collector 6 that covers the anode body 5; and a cathode collector 2 that is connected to the cathode body 3 and pulled out to outside. According to this secondary battery 15, since the secondary battery 20 can be made to have larger volume than that of the coin-shaped secondary battery 1 as shown in FIG. 1 easily, a large-capacity secondary battery can be achieved.

Modification 4

Figure 5:
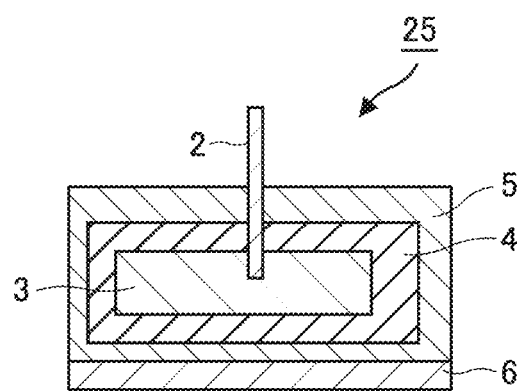
FIG. 5 is a cross-sectional view illustrating modification 4 of a secondary battery of the present invention.

FIG. 5 is a cross-sectional view showing the modification 4 of a secondary battery of the present invention. This secondary battery 25 includes: a block cathode body 3 disposed at the center; a solid electrolyte 4 that covers this cathode body 3; an anode body 5 that covers this solid electrolyte 4; an anode collector 6 that covers the anode body 5; and a cathode collector 2 that is connected to the cathode body 3 and pulled out to outside. The cathode collector 2 is pulled out to outside in a state insulated from the solid electrolyte 4, anode body 5, and anode collector 6. With this secondary battery 25, the outside of the cathode body 3 is embedded in the solid electrolyte 4 completely. With this secondary battery 25, the block cathode body 2 disposed at the center may be replaced by the anode body 5, and the anode body 5 may be replaced by the cathode body 2. According to this secondary battery 20, since the cathode body 3 of the secondary battery 25 is enclosed by the solid electrolyte completely, the degradation in charging-discharging characteristics can be suppressed.

Modification 5

Figure 6:
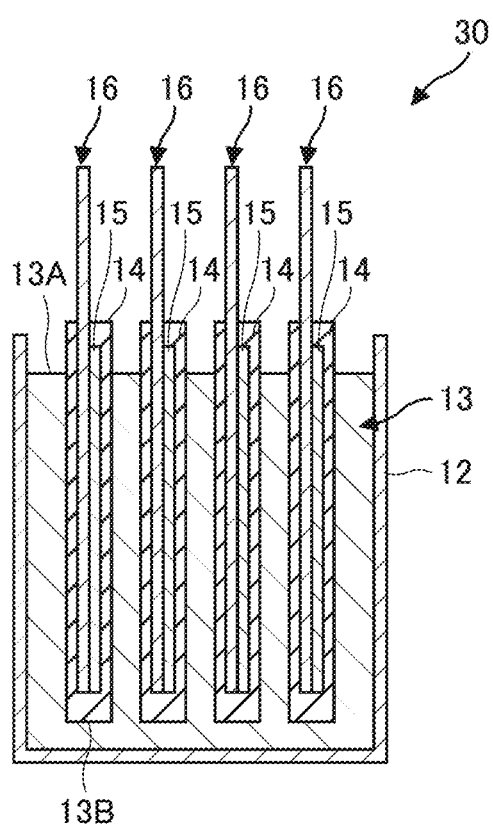
FIG. 6 is a cross-sectional view illustrating modification 5 of a secondary battery of the present invention.

FIG. 6 is a cross-sectional view showing the modification 5 of a secondary battery of the present invention. This secondary battery 30 includes a columnar cathode body 13, which has a plurality of convex portions 13A and concave portions 13B alternately. The secondary battery 30 includes: a cathode body 13, which is the convex portions 13A; a plurality of solid electrolytes 14 and anode bodies 15 that are disposed in these concave portions 13B; a cathode collector 12 that covers the outer periphery of the cathode body 13; and anode collectors 16 each of which is connected to each of the anode bodies 15 and pulled out to outside. According to this secondary battery 20, since the secondary battery 30 can be made to have larger volume than that of the coin-shaped secondary battery 1 shown in FIG. 1 easily, a large-capacity secondary battery can be achieved.

Modification 6

Figure 7:
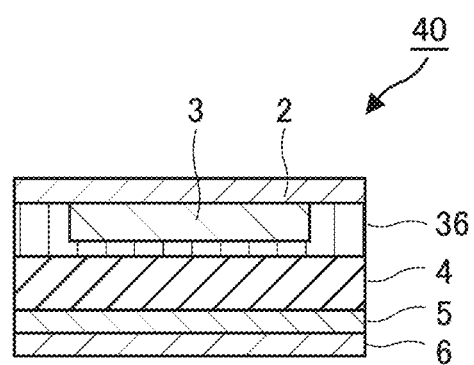
FIG. 7 is a cross-sectional view illustrating modification 6 of a secondary battery of the present invention.

FIG. 7 is a cross-sectional view showing the modification 6 of a secondary battery of the present invention. This secondary battery 40 differs from the secondary battery in FIG. 1 in that a polymeric layer 36 is inserted between the cathode body 3 and the solid electrolyte 4. This polymeric layer 36 can be made of a polyethylene oxide (PEO) or polyethylene glycol (PEG). It is only necessary that this polymeric layer 36 allows Li ions to pass through. This polymeric layer 36 also has a function of preventing the active material in the cathode body 3 from leaking to the side of the solid electrolyte 4, namely sealing the active material. The polymeric layer 36 is made of a material different from the supporting agent in the solid electrolyte 4.

The polymeric layer 36 is required to have chemically, physically, and thermally stable characteristics, and conduct $Li^+$ at low resistance. Polymers having such characteristics include PEO, PEG, polyvinyl alcohol (PVA), and polycarbonate. The difference in PEO and PEG listed above is the difference in molecular weight. The PEO, which has larger molecular weight, is desirable for the polymeric layer 36, with physical characteristics such as mechanical characteristics and melting point taken into consideration. However, with the increase in molecular weight of PEO, the property of conducting Li ions decreases. Consequently, as the polymeric layer 36, a mixture of the PEO having molecular weight of approximately 100,000, or a mixture of the PEO having large molecular weight (4.0 million for example) and PEG having small molecular weight (6000 for example) can be used. According to this secondary battery 40, since the polymeric layer 36 is inserted, the degradation in charging-discharging characteristics can be decreased further compared to the coin-shaped secondary battery 1 as shown in FIG. 1.

The polymeric layer 36 may also be inserted between the anode body 5 and the solid electrolyte 4. The polymeric layer 36 may also be inserted between the cathode body 3 and the solid electrolyte 4, and between the anode body 5 and the solid electrolyte 4.

According to the secondary battery 40 in modification 6, it has a structure where the cathode body 3 and/or the anode body 5 is/are sealed by the solid electrolyte 4, polymeric layer 36, cathode collector 2 and/or anode collector 6.

Modification 7

Figure 8:
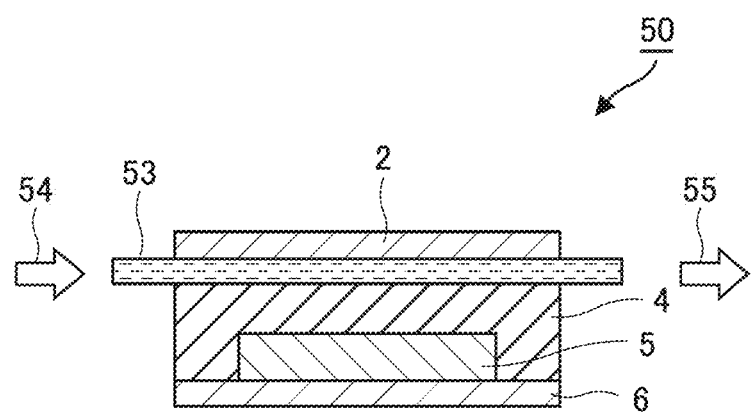
FIG. 8 is a cross-sectional view illustrating modification 7 of a secondary battery of the present invention.

FIG. 8 is a cross-sectional view showing the modification 7 of a secondary battery of the present invention. This secondary battery 50 differs from the secondary battery 1 in FIG. 1 in that a cathode body 53 is a liquid active material. The cathode body 53 has a liquid active material inflow port 54 and a liquid active material outflow port 55. The cathode body 53 is an active material solution or a molten active material. The active material undergoes reaction while flowing through a groove formed in the solid electrolyte 4. According to this secondary battery 50, even if the degradation in charging-discharging characteristics occurs, the liquid active material, namely the cathode body 53, can be replaced easily. Consequently, the secondary battery 50 can be kept charged and discharged for a long period of time.

Modifications 2 to 7 have a case member of the secondary battery as same as in the case of modification 1. The case member can be designed as required depending on the shape of the secondary battery.

The present invention will hereinafter be described further in detail by referring to examples.

Example 1

As the active material for the cathode body 3 in Example 1, a relatively high-potential quinone active material, 7,7,8,8-tetracyanoquinodimethane (TCNQ, Lot FIJ01, TOKYO CHEMICAL INDUSTRY CO., LTD.), was used. As the conductivity aid, acetylene black (AB, 133 $m^2/g$) (DENKA FX-35, DENKI KAGAKU KOGYO KABUSHIKI KAISHA) was mixed in TCNQ by the solution cast method, and furthermore, PTFE was added as the binding agent, to prepare an approximately 300 μm-thick cathode material paste. The ratio by weight of these materials, namely TCNQ:AB:PTFE, was 70:25:5. As PTFE, PTFE-6J manufactured by SIGMA-ALDRICH JAPAN was used. To this cathode material paste, EMI-TFSA (Io-li-tec in Germany, exported by KANTO CHEMICAL CO., INC.), which is an ionic liquid used for the solid electrolyte 4, was added by 2 μL per 5 mg of the paste.

The solid electrolyte 4 was prepared by mixing fumed silica and a 1 mol (M) EMI-TFSA solution of Li-TFSI in methanol at the volume ratio of 1:3, agitating the solution, and then by evaporating the methanol. The thickness of the solid electrolyte 4 was approximately 300 μm. As the fumed silica, 55130 manufactured by SIGMA-ALDRICH JAPAN was used, and as Li, the reagent by SIGMA-ALDRICH JAPAN was used.

To the approximately 300 μm-thick paste of materials for the cathode body 3, a material obtained by adding EMI-TFSA, which is an ionic liquid used for the solid electrolyte 4, by 2 μm per 5 mg of the paste, a PEO thin film 36 made of an approximately 100 μm-thick polyethylene oxide (PEO, molecular weight [MW]: 100,000), and an approximately 300 μm-thick solid electrolyte 4 were laminated in this order. As the PEO, the reagent by SIGMA-ALDRICH JAPAN was used.

Lastly, on the surface of the solid electrolyte 4 on which no cathode material paste or PEO thin film 36 was laminated, metallic Li, which functions as the anode body 5, was laminated, and sealed in a coin cell in an atmosphere of Ar gas to fabricate the all-solid battery.

Example 2

As the active material for the cathode body 3, tetrahydroxybenzoquinone (THBQ), which has large capacity, was used, and the all-solid battery in Example 2 was fabricated in the same manner as Example 1 except that the ratio by weight of the materials, namely THBQ:AB:PTFE, was 79.3:15.2:5.5. As the THBQ, the reagent by TOKYO CHEMICAL INDUSTRY CO., LTD. (Lot. MN3NN) was used.

Comparative Example 1

To compare with the all-solid battery in Example 1, the battery in Comparative Example 1 was fabricated by using a liquid electrolyte instead of the solid electrolyte 4 in Example 1. As the liquid electrolyte, (EC/DEC 1:1, 1 mol (M) LiClO$_4$) was used. EC/DEC is a 1:1 mixture of ethylene carbonate (EC) and diethyl carbonate (DEC), which are respectively represented by chemical formulae (1) and (2) as shown below. As the EC/DEC, the reagents by Kishida Chemical Co., Ltd. (LBG-00034) were used. The present invention expresses the mixture of EC and DEC as EC/DEC. The subsequent description assumes that EC and DEC are mixed at the ratio of 1:1, but any other ratios may be selected. Here, EC and DEC are organic electrolytes. As organic electrolytes, propylene carbonate (PC) represented by formula (3) as shown below, etc. can be used.

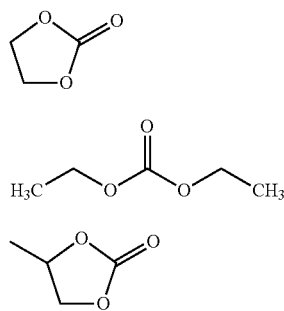

[Chemical formula 1]

[Chemical formula 2]

[Chemical formula 3]

(Evaluation of Charging-Discharging Characteristics)

The charging-discharging characteristics of the all-solid battery of the above Examples and the battery of Comparative Example were evaluated by the two-terminal method at 50° C., at 0.1 to 0.2 C, and the cutoff potential of 2.1 V to 4.0 V. The value 0.2 C is the full charging-full discharging rate at the current to reach the theoretical capacity in five hours. Fifth-cycle capacity retention rate is the ratio of the capacity in the 5th charging-discharging cycle to the initial charging capacity. The higher the capacity retention rate, the longer the capacity can be maintained, meaning that so-called cycle performance is good. Regarding the all-solid battery using THBQ as the active material for the cathode body 3 in Example 3, the charging-discharging characteristics were evaluated in a range from 1.7 V to 3.7 V. Note that the above capacity (mAh/g) is the value normalized by unit weight of the active material.

Figure 9:
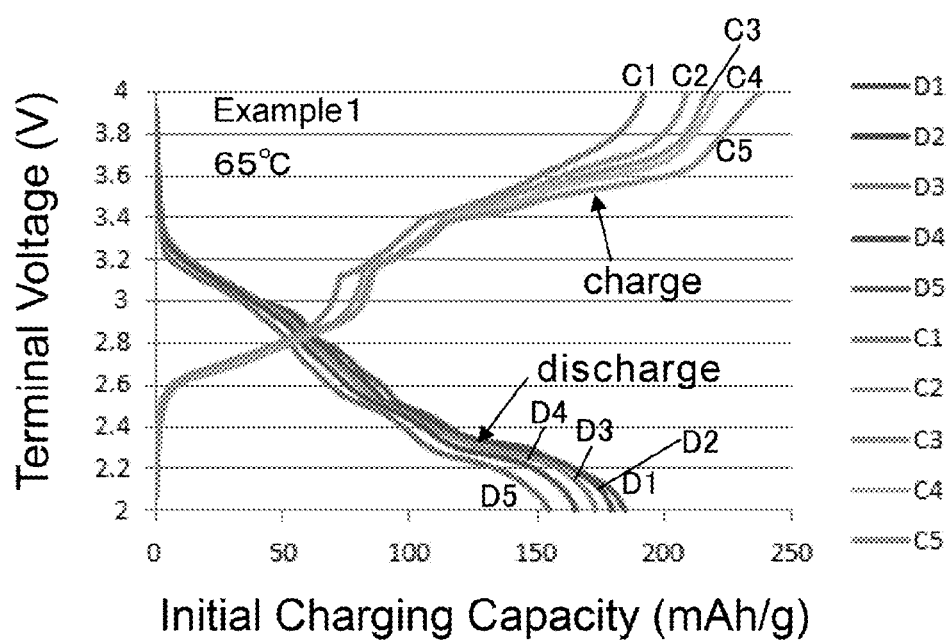
FIG. 9 is a chart showing the charging-discharging characteristics in Example 1.

FIG. 9 is a chart showing the charging-discharging characteristics in Example 1. The vertical axis in FIG. 9 represents terminal voltage (V), and the horizontal axis represents the initial charging capacity (mAh/g). As shown in FIG. 9, with the all-solid capacity battery using TCNQ as the active material for the cathode body 3 in Example 1, the initial charging capacity was approximately 184.4 mAh/g-TCNQ at 65° C., which is accounted for approximately 70% of the theoretical value of 262.5 mAh/g. The capacity in the 5th cycle was 155.2 mAh/g, meaning that the ratio to the initial charging capacity (capacity retention rate) was 70%.

Figure 10:
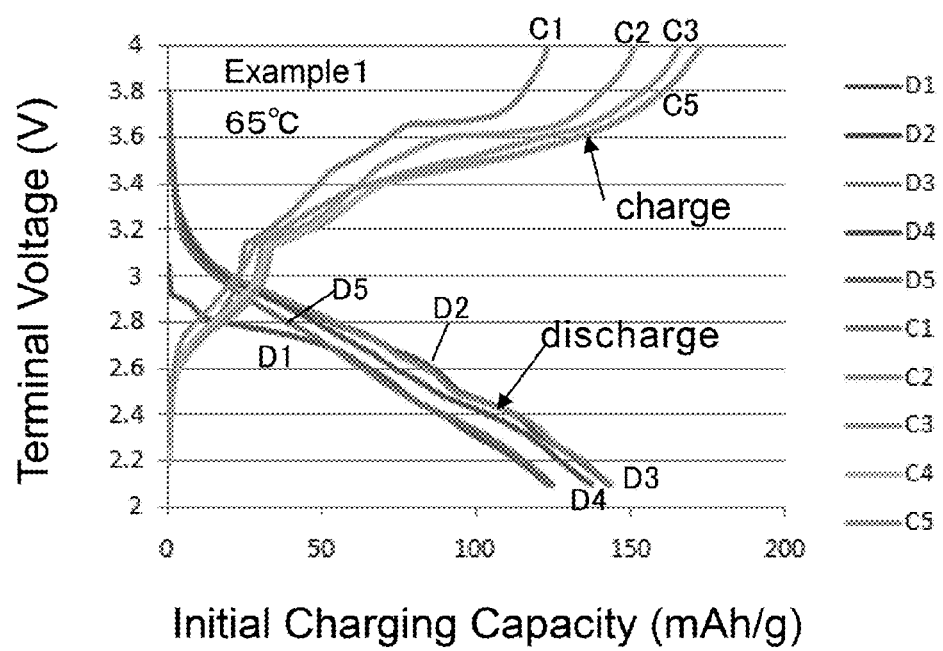
FIG. 10 is a chart showing the charging-discharging characteristics at 50° C. in Example 1.

FIG. 10 is a chart showing the charging-discharging characteristics at 50° C. in Example 1. As shown in FIG. 10, with the all-solid battery using TCNQ as the active material for the cathode body 3 in Example 1, the initial charging capacity was approximately 123.6 mAh/g-TCNQ at 50°, which is accounted for approximately 47% of the theoretical value of 262.5 mAh/g. The capacity in the 5th cycle was 124.8 mAh/g, meaning that the ratio to the initial charging capacity was 101%, and that the degradation in capacity in the 2nd to the 5th cycles was almost zero.

Figure 11:
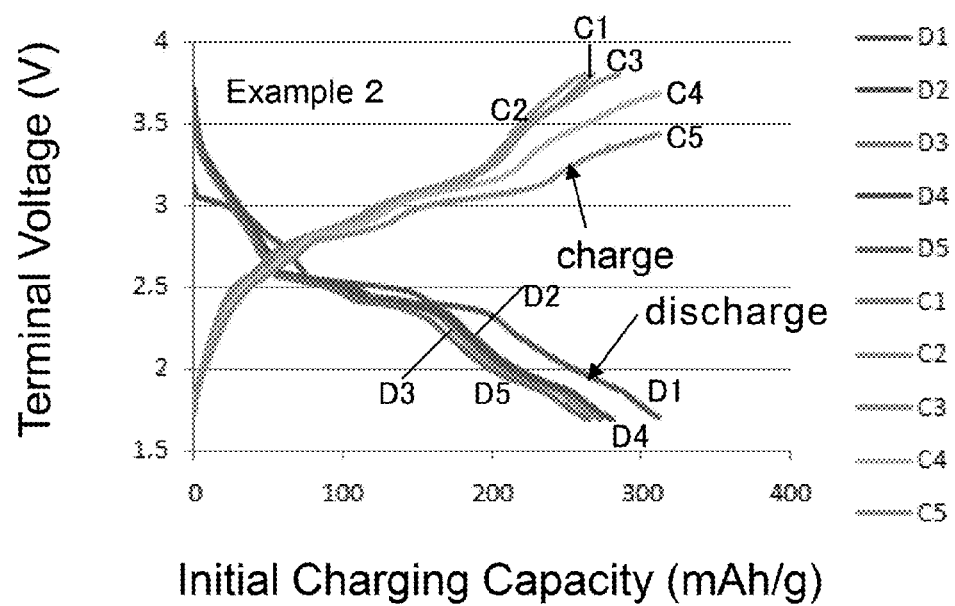
FIG. 11 is a chart showing the charging-discharging characteristics in Example 2.

FIG. 11 is a chart showing the charging-discharging characteristics in Example 2. As shown in this figure, with the all-solid battery using THBQ as the active material for the cathode body 3 in Example 2, the initial charging capacity of 311.7 mAh/g-THBQ, which is approximately the same as the theoretical value of 311.5 mAh/g, was obtained. The capacity in the 5th cycle was 264.9 mAh/g, meaning that the retention rate with respect to the initial value was 85%.

THBQ, the active material for the cathode body 3 used in Example 2, is known to have two redox potentials represented by the reaction formula (1) around 2.7 V (vs. Li/Li$^+$) and the reaction formula (2) around 2.0 V, respectively (Non-Patent Literature 2).

(1)

(2)

As shown in FIG. 11, with the charging-discharging characteristics of the all-solid battery in Example 2, it is apparent that plateaus are also found around 2.0 V and 2.7 V. This demonstrates that a plurality of electron reactions represented by the above reaction formulae (1) and (2) are occurring reversibly at the time of charge and discharge.

Figure 12:
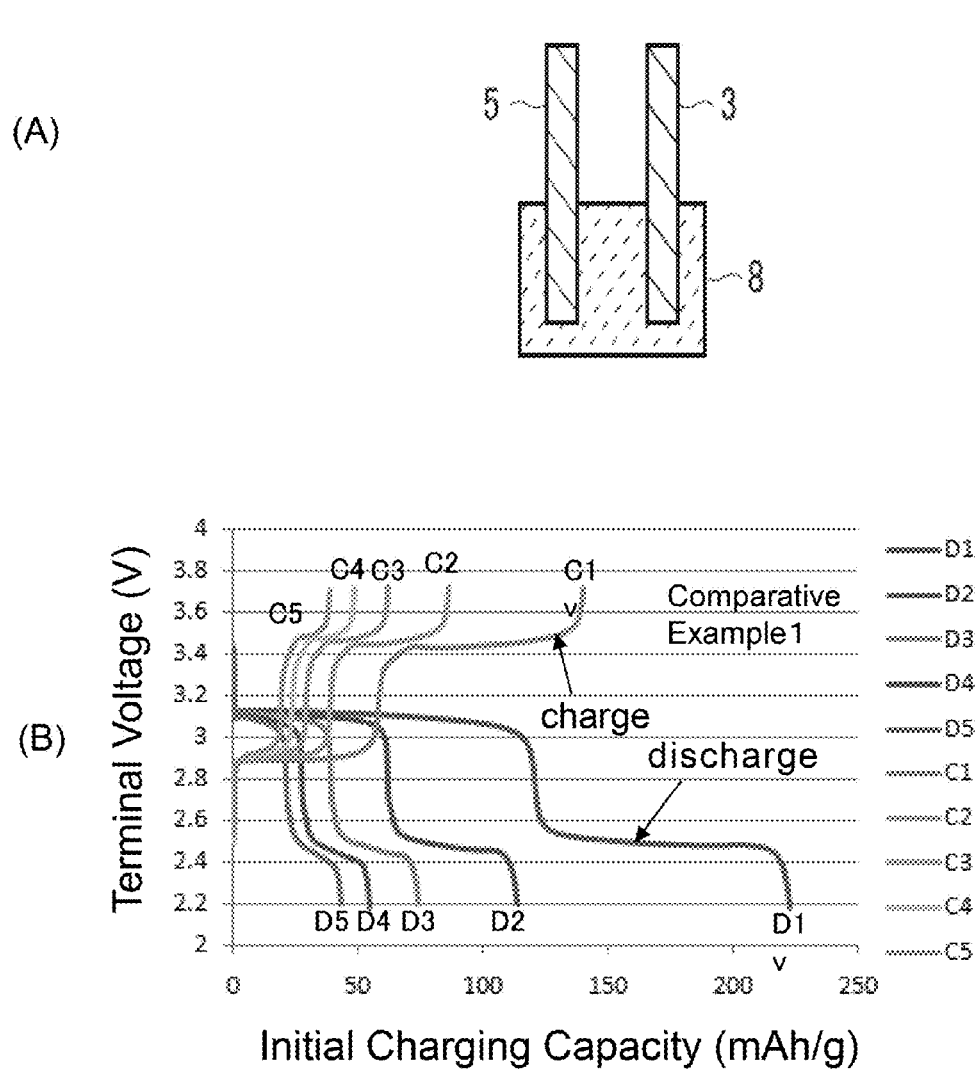
FIG. 12(A) is a schematic cross-sectional view of the battery in Comparative Example 1, and (B) is a chart showing the charging-discharging characteristics in Comparative Example 1.

FIG. 12(A) is a schematic cross-sectional view of the battery in Comparative Example 1, and FIG. 12(B) is a chart showing the charging-discharging characteristics in Comparative Example 1. As shown in FIG. 12(B), the initial charging capacity of the battery using room-temperature liquid electrolyte 8 in Comparative Example 1 was approximately 55.1 mAh/g-$_{TCNQ}$ at 25° C., which is accounted for 23.3% of the theoretical value of 236.1 mAh/g. The capacity in the 5th cycle was 11.1 mAh/g, meaning that the retention rate with respect to the initial value was 20.1%. In other words, the capacity of the battery using conventional liquid electrolyte in Comparative Example 1 was found to have decreased to lower than one-fourth of the initial value due to charge-discharge of 5 cycles.

As described above, it was found that by using the solid electrolyte 4 made of the composite material including silica and the electrolyte, and the organic cathode body 3 containing the active material at the ratio of approximately 80 wt % and having the thickness of approximately 300 μm, the all-solid battery unsusceptible to degradation could be fabricated while the electrode capacity was maintained at 70% of the theoretical value or higher.

Example 3

In Example 3, the approximately 300 μm-thick cathode material paste was prepared using DDQ (Lot. JD6XK, TOKYO CHEMICAL INDUSTRY CO., LTD.) as the active material for cathode body 3, acetylene black (AB) as the conductivity aid, and PTFE as the binding agent. The ratio by weight of these materials, namely DDQ:AB:PTFE, was 74.7:21.6:3.75. To this cathode material paste, the trace amount of EMI-TFSA, namely the ionic liquid used in solid electrolyte 4, was added. The solid electrolyte 4 was made to be in the same composition as that in Example 1. AB and PTFE (9:1) were also mixed for approximately 30 minutes until they turned into a paste, which was used as the lid for sealing the active material to be described later.

On the approximately 300 μm-thick solid electrolyte 4, two members, namely the cathode material paste and the acetylene black (AB) cathode collector 2, were laminated, and a pellet in which the cathode material was sealed was prepared using a hard dice and a pressing machine. On the surface opposite to the cathode collector 2 on the side of the solid electrolyte 4 of this pellet, metallic Li, which functions as a cathode body 5, was laminated, and the item was sealed in a coin-cell-shaped case 1b in the atmosphere of Ar gas to fabricate the all-solid battery.

The charging-discharging characteristics of the all-solid battery in Example 3 were measured at 65° C., 0.2 C, and the average voltage of 3.2 V in the same manner as Example 1.

Figure 13:
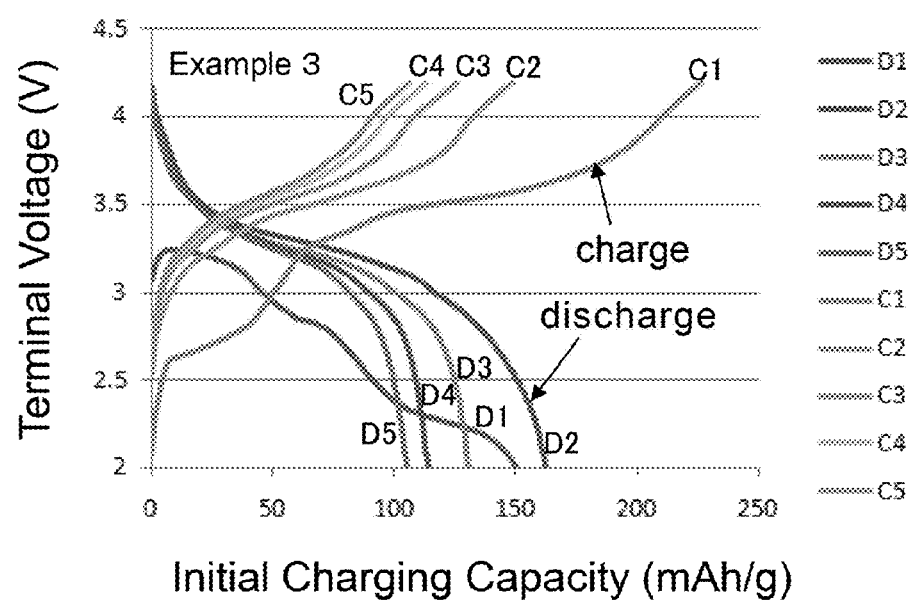
FIG. 13 is a chart showing the charging-discharging characteristics in Example 3.

FIG. 13 is a chart showing the charging-discharging characteristics in Example 3. As shown in the figure, the initial charging capacity was 150.3 mAh/g, which is accounted for 64% of the theoretical value of 236.1 mAh/g. The capacity in the 5th cycle was 105.2 mAh/g, meaning that the retention rate with respect to the initial value was 70%.

Example 4

The all-solid battery in Example 4 was fabricated in the same manner as Example 3, except that the ratio by weight of the materials for the cathode body 3, namely DDQ:AB:PTFE, was 94.4:3.5:2.1.

Figure 14:
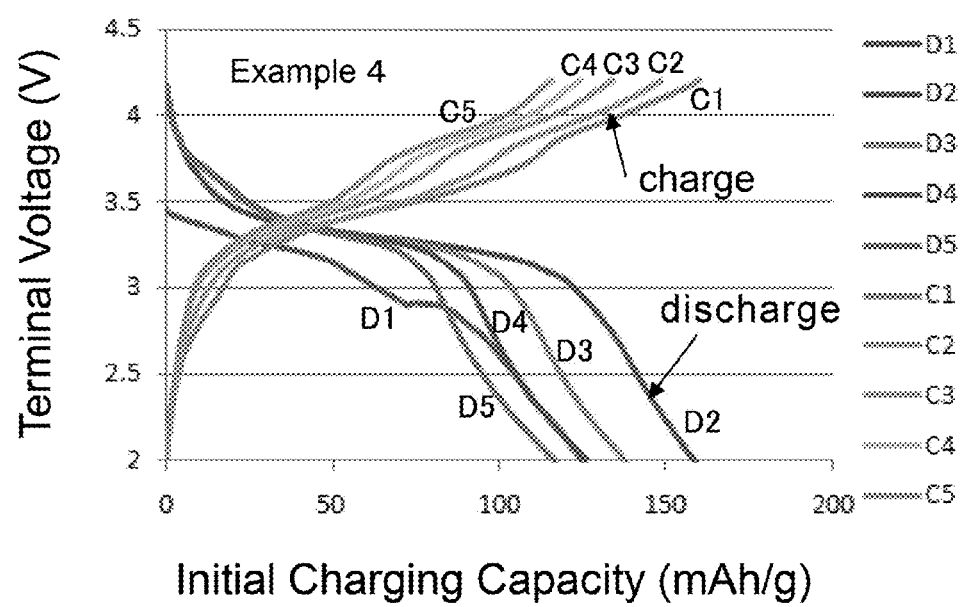
FIG. 14 is a chart showing the charging-discharging characteristics in Example 4.

FIG. 14 is a chart showing the charging-discharging characteristics in Example 4. As shown in this figure, the charging-discharging characteristics of the all-solid battery in Example 4 were measured under the same condition as Example 3. The initial charging capacity was 158.9 mAh/g, which is accounted for 67% of the theoretical value of 236.1 mAh/g. The capacity in the 5th cycle was 117.2 mAh/g, meaning that the retention rate was approximately 74%.

Example 5

The all-solid battery in Example 5 was fabricated in the same manner as Example 3, except that the ratio by weight of the materials for the cathode body 3, namely THBQ:AB:PTFE, was 79.3:15.2:5.5. The charging-discharging characteristics of the all-solid battery in Example 5 were measured at 30° C., 0.2 C, and the average voltage of 2.3 V in the same manner as Example 1.

Figure 15:
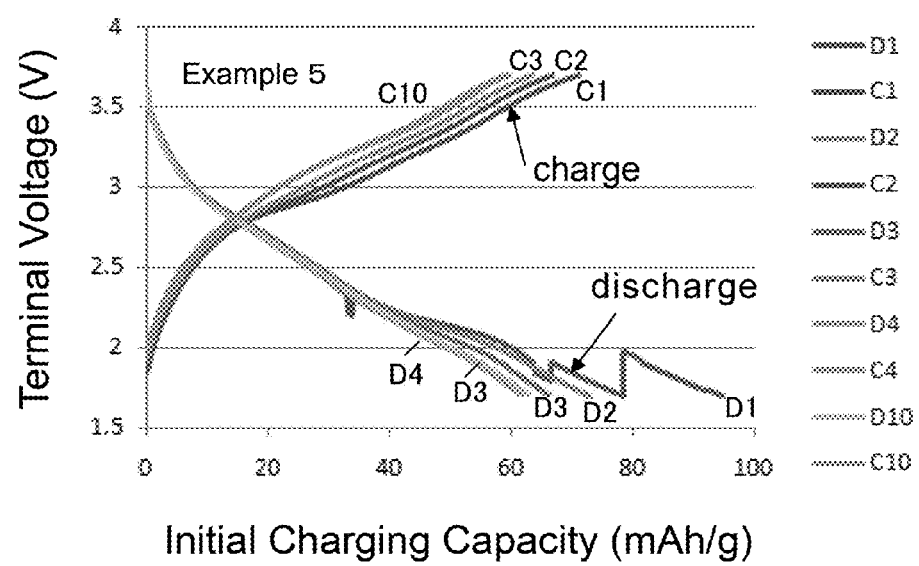
FIG. 15 is a chart showing the charging-discharging characteristics in Example 5.

FIG. 15 is a chart showing the charging-discharging characteristics in Example 5. As shown in this chart, the initial charging capacity was 78.5 mAh/g, which is accounted for 25% of the theoretical value of 311.5 mAh/g. The capacity in the 5th cycle was 62.9 mAh/g, meaning that the retention rate was approximately 80%.

Example 6

As the active material for the cathode body 3, a mixture of DDQ and FeAA (tris(2,4-pentanedionato)iron(III), also represented as iron (III)acetylacetonate) was used. The ratio by weight of DDQ and FeAA was 3:1. The all-solid battery in Example 6 was fabricated in the same manner as Example 3, except that the ratio by weight of the materials for cathode body 3, namely (DDQ+FeAA):AB:PTFE, was 78.8:16.8:4.3. As the FeAA, Lot. JP182 of DOJINDO LABORATORIES was used. The charging-discharging characteristics of the all-solid battery in Example 6 were measured at 65° C., 0.2 C, and the average voltage of 3.0 V in the same manner as Example 1.

Figure 16:
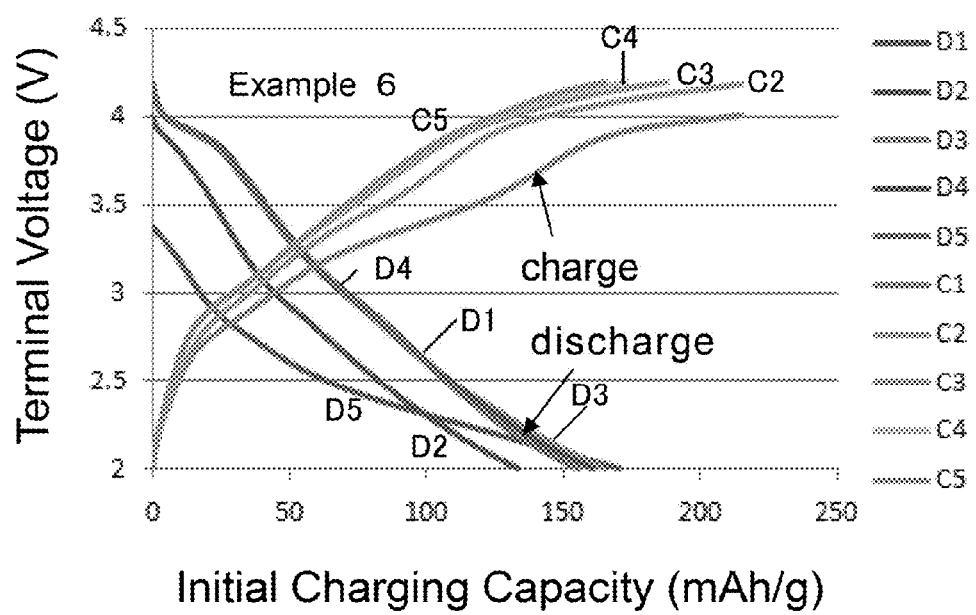
FIG. 16 is a chart showing the charging-discharging characteristics in Example 6.

FIG. 16 is a chart showing the charging-discharging characteristics in Example 6. As shown in this figure, the initial charging capacity was 170.1 mAh/g, which is accounted for 79% of the theoretical value of 214.6 mAh/g. The capacity in the 5th cycle was 155.1 mAh/g, meaning that the retention rate was 91.2%.

Example 7

As Example 7, the solid electrolyte 4 was mixed into the cathode body 3. The materials for the cathode body 3, namely THBQ, AB as the conductivity aid, PTFE as the binding agent, and the solid electrolyte 4 in Example 1, were mixed in an agate mortar for approximately 30 minutes until they turned into a paste. The ratio by weight of these materials for the cathode body 3, namely THBQ:AB:PTFE:solid electrolyte, was 37.0:11.3:2.7:48.9. On the approximately 300 µm-thick solid electrolyte 4, the cathode material paste, into which the above-mentioned solid electrolyte 4 was mixed, and the covering member, i.e. three parts, were laminated, and a pellet in which the cathode materials were sealed was prepared using the hard dice and the pressing machine. On the surface of this pellet opposite to the cover on the side of the solid electrolyte 4, metallic Li, which functions as the anode body 5, was laminated, and sealed in the coin cell in the atmosphere of Ar gas to fabricate the all-solid battery in Example 7.

The charging-discharging characteristics of the all-solid battery in Example 7 were measured at room temperature of 30° C. 0.2 C, and the average voltage of 2.3 V in the same manner as Example 1.

Figure 17:
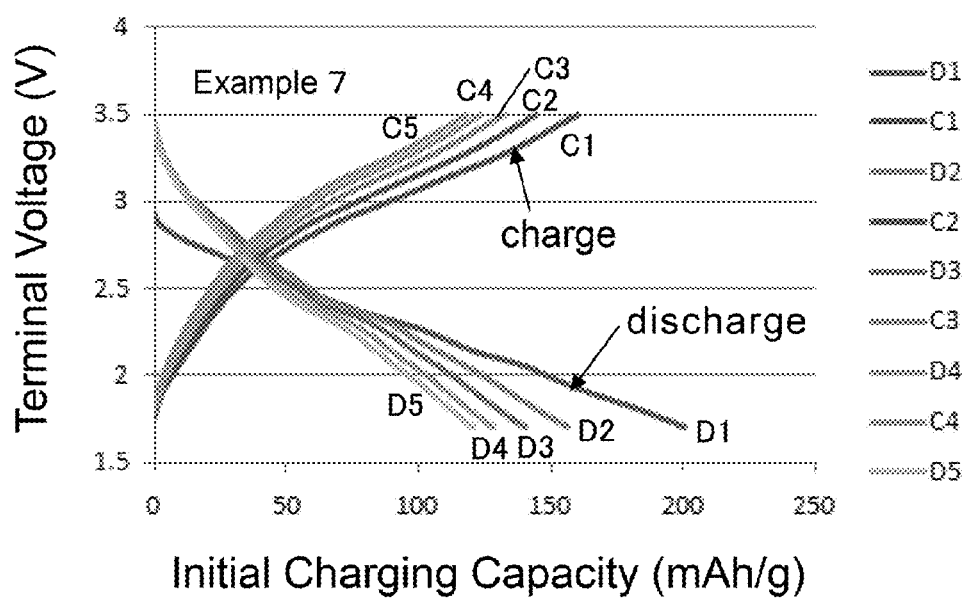
FIG. 17 is a chart showing the charging-discharging characteristics in Example 7.

FIG. 17 is a chart showing the charging-discharging characteristics in Example 7. As shown in this figure, the initial charging capacity was 200.6 mAh/g, which is accounted for 64% of the theoretical value of 311.5 mAh/g. The capacity in the 5th cycle was 121.0 mAh/g, meaning that the retention rate was 60.3%. The all-solid battery in Example 7 was operated at room temperature.

Example 8

The all-solid battery in Example 8 was fabricated in the same manner as Example 7, except that the active material was a mixture of DDQ and TCNQ mixed at the ratio by weight of 1:1, and that the ratio by weight of the materials for the cathode body 3, namely (DDQ+TCNQ):AB:PTFE:solid electrolyte, was 37.6:9.8:3.8:48.8. The charging-discharging characteristics of the all-solid battery in Example 8 were measured at 65° C., 0.2 C, and the average voltage of 2.8 V.

Figure 18:
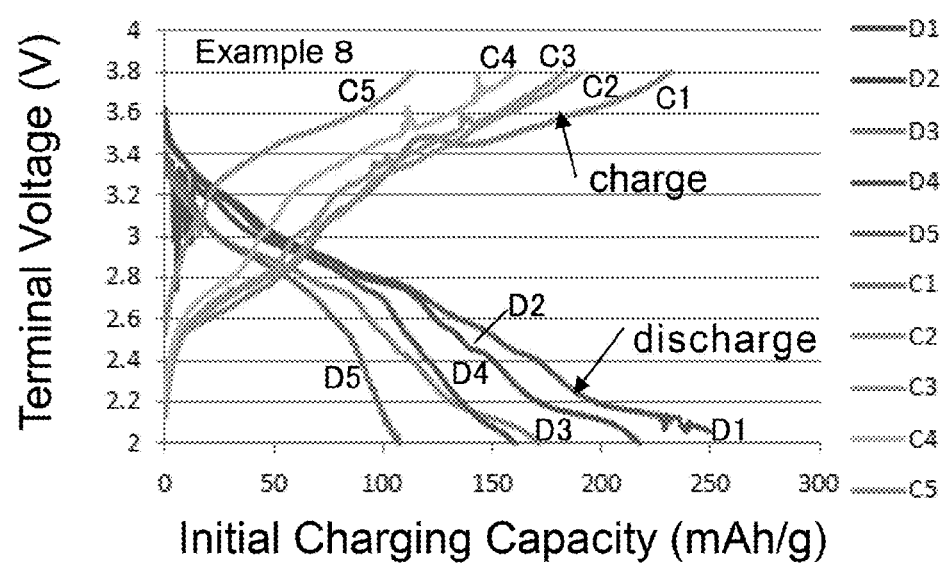
FIG. 18 is a chart showing the charging-discharging characteristics in Example 8.

FIG. 18 is a chart showing the charging-discharging characteristics in Example 8. As shown in this figure, the initial charging capacity was 249.3 mAh/g, the same value as the theoretical value. The capacity in the 5th cycle was 158.2 mAh/g, meaning that the retention rate was 63.5%.

Example 9

The all-solid battery in Example 9 was fabricated in the same manner as Example 3, except that the active material was a mixture of TCNQ and S mixed at the ratio by weight of 1:1, and that the ratio by weight of the cathode body 3, namely (TCNQ+S):AB:PTFE, was 46.5:48.8:4.7. As S, Colloid A by Tsurumi Chemical Co., Ltd. was used. The charging-discharging characteristics of the all-solid battery in Example 9 were measured at 65° C., 0.2 C, and the average voltage of 2.2 V in the same manner as Example 1.

Figure 19:
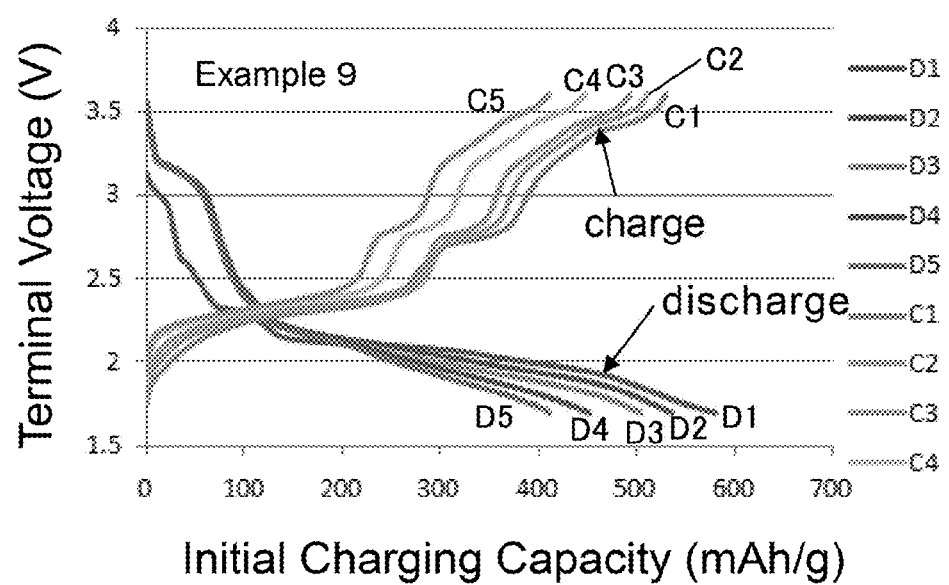
FIG. 19 is a chart showing the charging-discharging characteristics in Example 9.

FIG. 19 is a chart showing the charging-discharging characteristics in Example 9. As shown in this figure, the initial charging capacity was 580.1 mAh/g, which is accounted for 60% of the theoretical value of 962.0 mAh/g. The capacity in the 5th cycle was 411 mAh/g, meaning that the retention rate was approximately 71%.

Example 10

In Example 10, a mixture of TCNQ and S mixed in the ratio by weight of 1:1, to which solid electrolyte was further added, was used as the active material. The all-solid battery in Example 10 was fabricated in the same manner as Example 7, except that the ratio by weight of the materials for cathode body 3, namely (TCNQ+S):AB:PTFE:solid electrolyte, was 23.2:24.3:2.4:50.2. The charging-discharging characteristics of the all-solid battery in Example 10 were measured at 65° C., 0.2 C, and the average voltage of 2.2 V in the same manner as Example 1.

Figure 20:
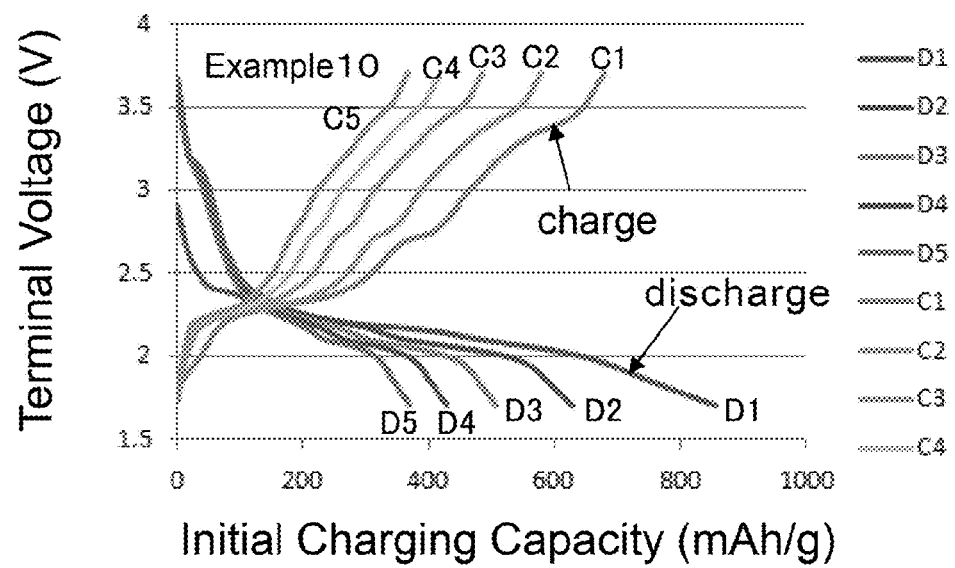
FIG. 20 is a chart showing the charging-discharging characteristics in Example 10.

FIG. 20 is a chart showing the charging-discharging characteristics in Example 10. As shown in this figure, the initial charging capacity was 855.8 mAh/g, which is accounted for 90% of the theoretical value of 962.0 mAh/g. The capacity in the 5th cycle was 369.3 mAh/g, meaning that the retention rate was approximately 43%.

Example 11

As Example 11, a mixture of polyaniline and S mixed in the ratio by weight of 1:1, to which solid electrolyte was further added, was used as the active material. The all-solid battery in Example 11 was fabricated in the same manner as Example 7, except that the ratio by weight of the materials for the cathode body 3, namely (polyaniline+S):AB:PTFE:solid electrolyte, was 42.7:10.7:6.3:40.3. As polyaniline, G10T102 by Alfa Aesar was used. The charging-discharging characteristics of the all-solid battery in Example 11 were measured at 65° C., 0.2 C, and the average voltage of 2.2 V in the same manner as Example 1.

Figure 21:
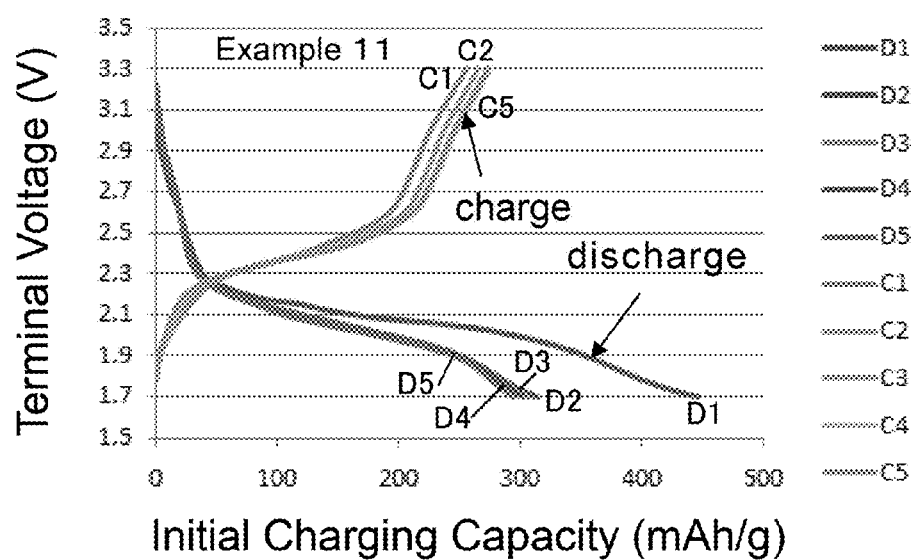
FIG. 21 is a chart showing the charging-discharging characteristics in Example 11.

FIG. 21 is a chart showing the charging-discharging characteristics in Example 11. As shown in this figure, the initial charging capacity was 446.2 mAh/g, which is accounted for 50% of the theoretical value of 962.0 mAh/g. The capacity in the 5th cycle was 293 mAh/g, meaning that the retention rate was approximately 66%.

Example 12

The all-solid battery in Example 12 was fabricated in the same manner as Example 7, except that TCNQ was used as the active material, graphene was used as the conductivity aid, and the ratio by weight of the materials for the cathode body 3, namely TCNQ:graphene:PTFE:solid electrolyte, was 26.5:23.4:2.2:47.9. The graphene was synthesized using the modified hammer method described in Non-Patent Literature 3. The charging-discharging characteristics of the all-solid battery in Example 12 were measured at 65° C., 0.2 C, and the average voltage of 2.4 V in the same manner as Example 1.

Figure 22:
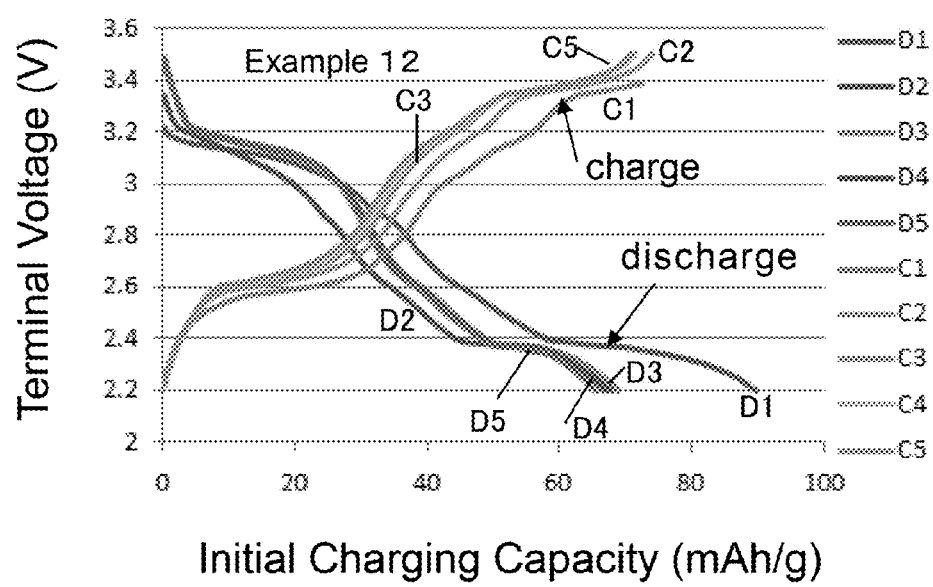
FIG. 22 is a chart showing the charging-discharging characteristics in Example 12.

FIG. 22 is a chart showing the charging-discharging characteristics in Example 12. As shown in this figure, the initial charging capacity was 89.7 mAh/g, which is accounted for 34% of the theoretical value of 262.5 mAh/g. The capacity in the 5th cycle was 65.5 mAh/g, meaning that the retention rate was 73.0%.

Example 13

The all-solid battery in Example 13 was fabricated in the same manner as Example 7, except that a mixture of DDQ and PEO mixed in the ratio by weight of 3:1 was used as the active material, and that the ratio by weight of the materials for the cathode body 3, namely (DDQ+PEO):AB:PTFE:solid electrolyte, was 24.7:20.7:7.5:47.0. The charging-discharging characteristics of the all-solid battery in Example 13 were measured at 65° C., 0.2 C, and the average voltage of 2.8 V in the same manner as Example 1.

Figure 23:
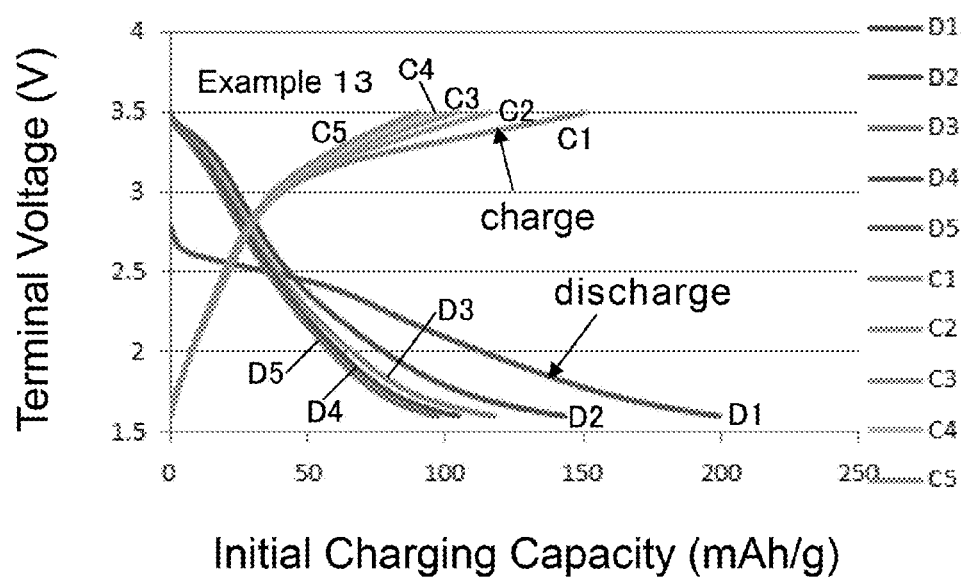
FIG. 23 is a chart showing the charging-discharging characteristics in Example 13.

FIG. 23 is a chart showing the charging-discharging characteristics in Example 13. As shown in this figure, the initial charging capacity was 199.0 mAh/g, which is accounted for 112% of the theoretical value of 177.3 mAh/g. The capacity in the 5th cycle was 96.8 mAh/g, meaning that the retention rate was 48.6%.

Example 14

The all-solid battery in Example 14 was fabricated in the same manner as Example 7, except that a mixture of TCNQ and PEO mixed in the ratio by weight of 3:1 was used as the active material, and that the ratio by weight of the materials for the cathode body 3, namely (TCNQ+PEO):AB:PTFE:solid electrolyte, was 23.0:23.2:7.0:46.8. The charging-discharging characteristics of the all-solid battery in Example 14 were measured at 65° C., 0.2 C, and the average voltage of 2.8 V in the same manner as Example 1.

Figure 24:
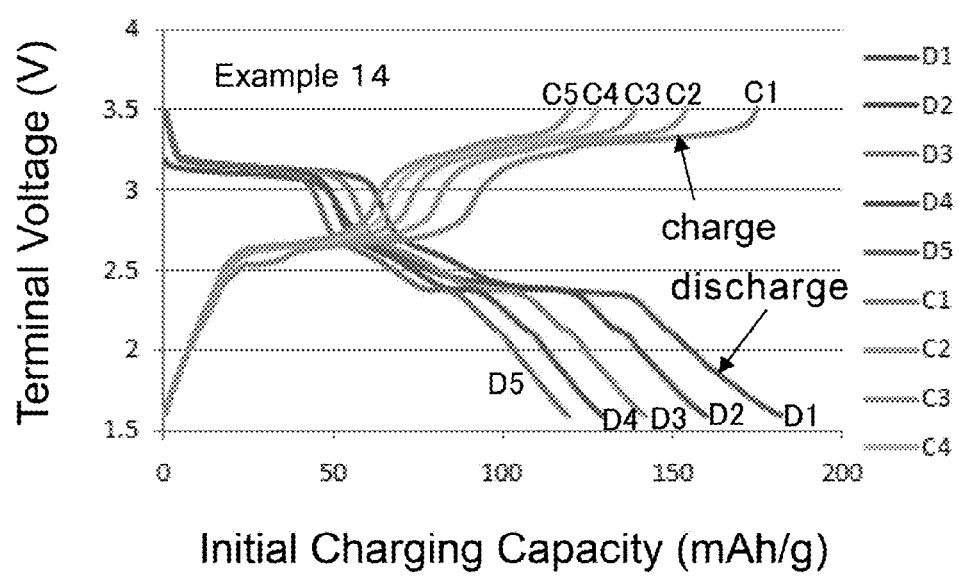
FIG. 24 is a chart showing the charging-discharging characteristics in Example 14.

FIG. 24 is a chart showing the charging-discharging characteristics in Example 14. As shown in this figure, the initial charging capacity was 182.1 mAh/g, which is accounted for 95% of the theoretical value of 191.2 mAh/g. The capacity in the 5th cycle was 119.1 mAh/g, meaning that the retention rate was 65.4%.

Example 15

The all-solid battery in Example 15 was fabricated in the same manner as Example 7, except that DDQ was used as the active material, that the ratio by weight of the materials for the cathode body 3, namely DDQ:AB:PTFE:solid electrolyte, was 28.8:8.1:11.3:48.8, and that the anode body 5 was also embedded in the solid electrolyte 4. The secondary battery in Example 15 has the structure as shown in FIG. 2. The charging-discharging characteristics of the all-solid battery in Example 15 were measured at 65° C., 0.2 C and the average voltage of 1.9 V in the same manner as Example 1.

Figure 25:
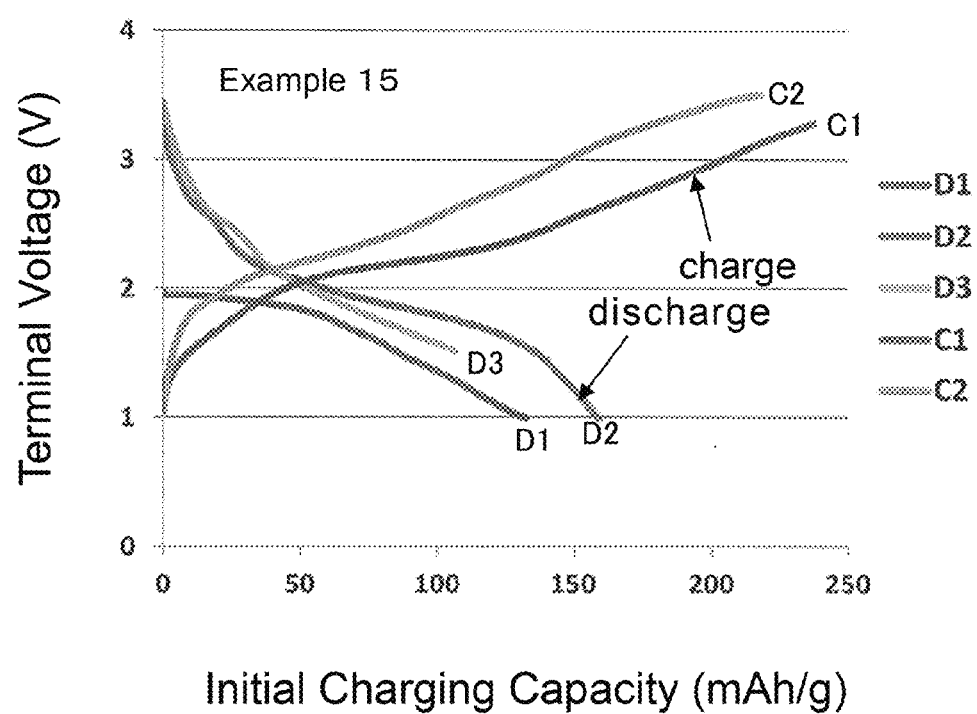
FIG. 25 is a chart showing the charging-discharging characteristics in Example 15.

FIG. 25 is a chart showing the charging-discharging characteristics in Example 15. As shown in this figure, the initial charging capacity was 132.5 mAh/g, which is accounted for 56.1% of the theoretical value of 236.1 mAh/g. The capacity in the 2nd cycle was 158.9 mAh/g, meaning that the retention rate was 119.9%.

Comparative Example 2

The all-solid battery in Comparative Example 2 was fabricated in the same manner as Example 8, except that benzoquinone (BQ, $C_6H_4O_2$) was used as the active material, and that the ratio by weight of the materials for the cathode body, namely BQ:AB:PTFE:solid electrolyte, was 35.7:9.3:2.8:40.3. BQ (reagent, Lot 52413Y, Kishida Chemical Co., Ltd.) is represented by chemical formula (4) as shown below.

[Chemical formula 4]

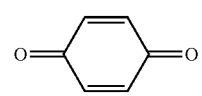

The charging-discharging characteristics of the all-solid battery in Comparative Example 2 were measured at 65° C., 0.2 C, and the average voltage of 2.5 V in the same manner as Example 1.

Figure 26:
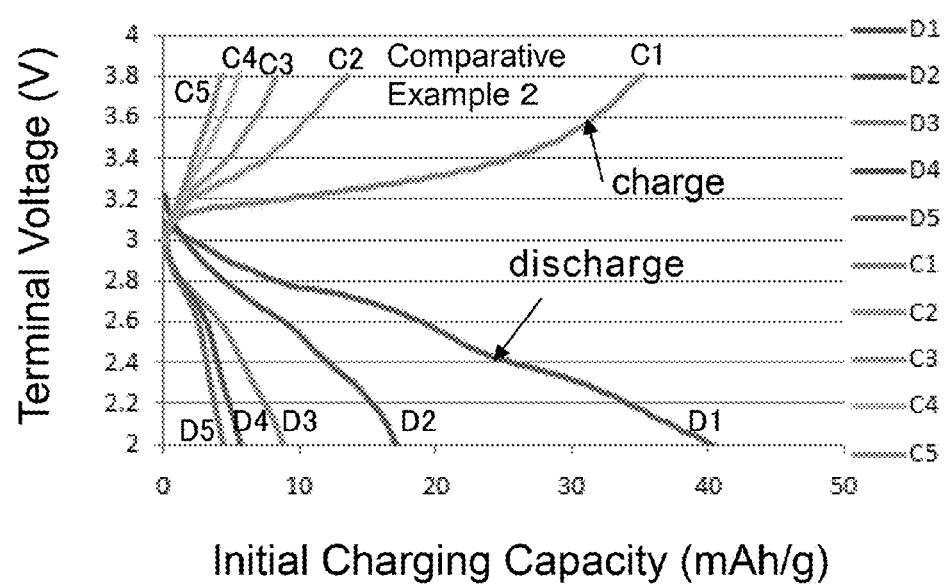
FIG. 26 is a chart showing the charging-discharging characteristics in Comparative Example 2.

FIG. 26 is a chart showing the charging-discharging characteristics in Comparative Example 2. As shown in this figure, the initial charging capacity was 40.4 mAh/g, which is accounted for 8.1% of the theoretical value of 459.9 mAh/g. The capacity in the 5th cycle was 4.5 mAh/g, meaning that the retention rate was 11.3%. In Comparative Example 2, the active material in the cathode body was decomposed, thus causing the initial charging capacity and retention rate to decrease significantly compared to Examples 8, 13, and 14.

Comparative Example 3

The battery in Comparative Example 3 was fabricated in the same manner as Comparative Example 1, except that DDQ was used as the active material, and that the ratio by weight of the materials for the cathode body 3, namely DDQ:AB:PTFE, was 43.7:42.9:13.4. The charging-discharging characteristics of the all-solid battery in Comparative Example 3 were measured at 25° C., 0.2 C, and the average voltage of 3.3 V in the same manner as Example 1.

Figure 27:
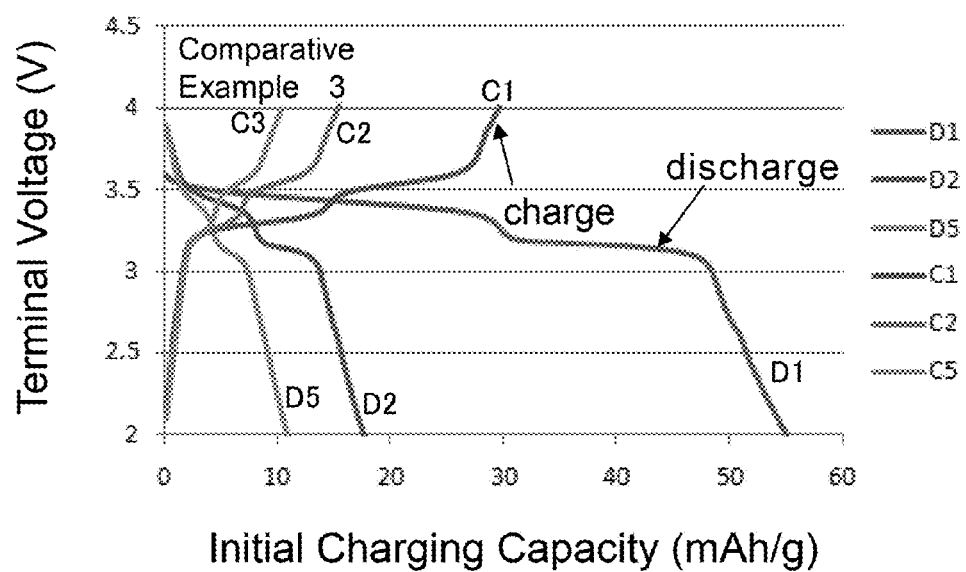
FIG. 27 is a chart showing the charging-discharging characteristics in Comparative Example 3.

FIG. 27 is a chart showing the charging-discharging characteristics in Comparative Example 3. As shown in this figure, the initial charging capacity was 55.1 mAh/g, which is accounted for 23.3% of the theoretical value of 236.1 mAh/g. The capacity in the 5th cycle was 11.1 mAh/g, meaning that the retention rate was approximately 11.1%. In Comparative Example 3, the initial charging capacity and the capacity in the 5th cycle were much lower than those of the Examples as shown above.

Comparative Example 4

The battery in Comparative Example 4 was fabricated by using TCNQ as the active material, allowing the ratio by weight of the materials for the cathode body 3, namely TCNQ:AB:PTFE:solid electrolyte, to be 37.2:9.8:2.7:50.3, and simply laminating these materials. The charging-discharging characteristics of the all-solid battery in Comparative Example 4 were measured at 75° C., 0.2 C, and the average voltage of 2.8 V in the same manner as Example 1.

FIG. 28(A) is a schematic cross-sectional view of the battery in Comparative Example 4, and FIG. 28(B) is a chart showing the charging-discharging characteristics in Comparative Example 4. As shown in FIG. 28(B), the initial charging capacity was 89 mAh/g, which is accounted for 33.8% of the theoretical value of 263 mAh/g. The capacity in the 5th cycle was 25 mAh/g, meaning that the retention rate was approximately 28%. In Comparative Example 4, the initial charging capacity and the capacity in the 5th cycle were much lower than those in the above Examples.

Comparative Example 5

Figure 29:
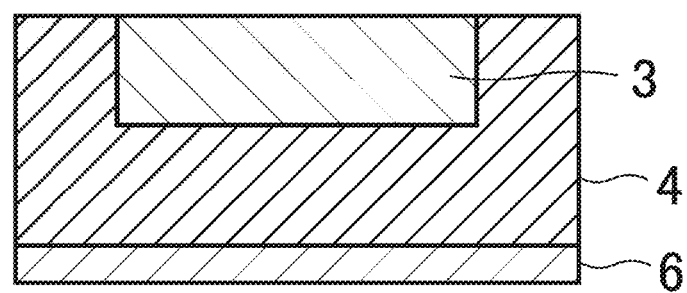
FIG. 29 is a cross-sectional view illustrating the structure of the battery in Comparative Example 5.

The battery in Comparative Example 5 was fabricated in the same manner as Example 7, except that DDQ was used as the active material, that the ratio by weight of the materials for the cathode body 3, namely DDQ:AB:PTFE:solid electrolyte, was 37.0:10.8:1.8:50.4, and that the cathode collector was not used. FIG. 29 is a cross-sectional view showing the structure of the battery in Comparative Example 5. The charging-discharging characteristics of the all-solid battery in Comparative Example 5 were measured at 65° C., 0.2 C, and the average voltage of 3.2 V in the same manner as Example 1. The initial charging capacity was 109.5 mAh/g, which is accounted for 46.4% of the theoretical value of 263.1 mAh/g. The capacity in the 5th cycle was 48 mAh/g, meaning that the retention rate was 43.8%.

In Comparative Example 5, the active material in the cathode body is embedded in the solid electrolyte, unlike Comparative Example 4, but the top part of the active material for the cathode body is not sealed by cathode collector completely. Consequently, the initial charging capacity and the retention rate in Comparative Example 5 are larger than those of Comparative Example 4, but the initial charging capacity and the capacity in the 5th cycle were lower than those in the Examples.

According to Examples and Comparative Examples described above, it was found that with the secondary battery 1, 10 of the present invention, the initial charging capacity of 70 to 100% of the theoretical value can be obtained, and that degradation in characteristics was small even if the charge and discharge were repeated.

The secondary battery, which was fabricated in the same manner as the above-mentioned Examples and whose characteristics had degraded due to repeated charge and discharge, was disassembled and examined.

FIG. 30 is an optical image of the disassembled secondary battery with degraded characteristics, where (A) shows the optical image, and (B) is a schematic diagram explaining (A). As shown in FIG. 30(B), around the circular cathode collector 2 made of acetylene black (AB), a region 5A of a material having leaked from the active material of the cathode body 3, which is placed at the bottom of the cathode collector 2, is generated. In the optical image in FIG. 30(A), the circular cathode collector 2 was visually perceived as black, and the region 5A of the material having leaked from the active material of the cathode body 3 was perceived as brown. For example, as described in Example 3, the active material for the cathode body 3 was solid before charge and discharge. Consequently, the active material in the cathode body 3 is assumed to have undergone phase transition from a solid into a phase containing a liquid due to charge and discharge. Furthermore, with the secondary battery with degraded characteristics, the active material in the cathode body 3 is assumed to have leaked to outside the cathode collector 2.

The leakage of the active material in the cathode body 3 was highly noticeable in Comparative Example 4 etc., where the cathode body 3 was not sealed completely by the solid electrolyte 4 and the cathode collector 2. In other words, when the active material in the cathode body 3 is made to be sealed by the solid electrolyte 4 and the cathode collector 2, the degree of leakage of the active material in the cathode body 3 is assumed to decrease, and at the same time, degradation in the charging-discharging characteristics is assumed not to occur easily.

Example 16

Figure 31:
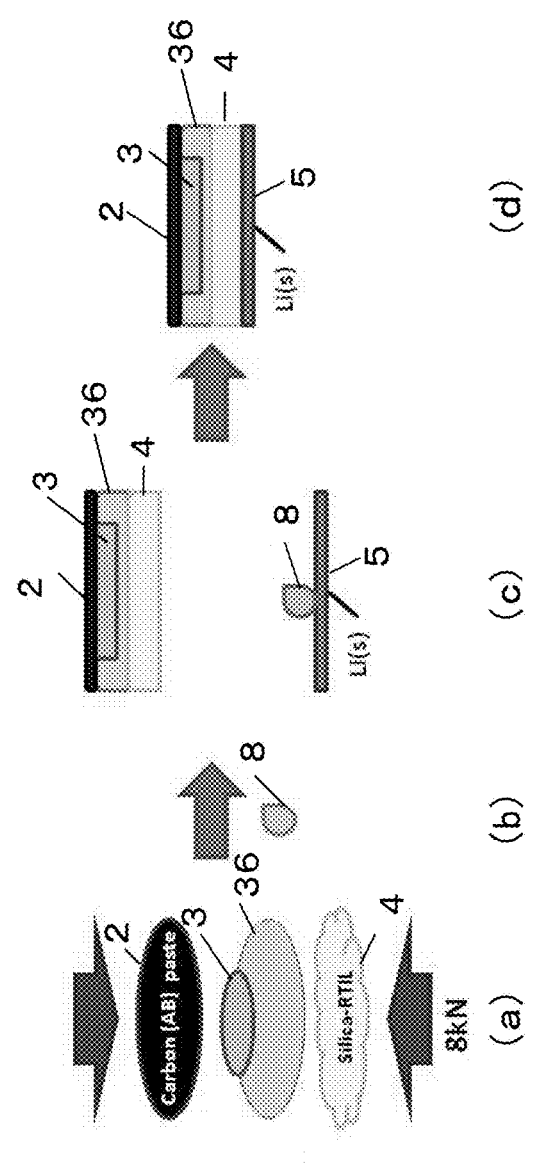
FIG. 31 is a schematic view illustrating a method of fabricating the secondary battery in Example 16, where (a) is a process of preparing a pellet on the cathode side, (b) is a process of dropping a Li-TFSA solution, (c) is a process of adding EC/DEC and 5 μL of 1 mol (M) LiClO$_4$, and (d) is a process of sealing.

FIG. 31 is a schematic view showing the method of fabricating the secondary battery in Example 16, where (a) shows a process of preparing a pellet on the cathode side, (b) shows a process of dropping a Li-TFSA solution, (c) shows a process of adding EC/DEC and 5 μL ($5 \times 10^{-6}$ liter) of 1 mol (M) $LiClO_4$, and (d) shows a sealing process.

As shown in FIG. 31(a), TCNQ was used as the material of paste for the cathode body 3. Ketjen Black (KB, 1300 $m^2/g$) was mixed into TCNQ as the conductivity aid by the solution cast method, and PTFE was further added as the binding agent, to prepare approximately 300 μm-thick cathode material paste. The ratio by weight of these materials, namely TCNQ:KB:PTFE, was 46:49:5. Unlike Example 1, the Li-TFSA solution was not added to this paste material for the cathode body 3. As the polymeric layer 36, a mixed PEO film was used instead of the PEO film used in Example 1. The mixed PEO film 36 was obtained by mixing PEO having the molecular weight of 6000, PEO having the molecular weight of 4.0 million, and Li-TFSA at the ratio by weight of 8:1:1 in acetonitrile, and drying the mixture.

The solid electrolyte 4 was prepared by mixing fumed silica and a 1 mol (M) EMI-TFSA solution of Li-TFSA (Io-li-tec in Germany, exported by KANTO CHEMICAL CO., INC., hereinafter referred to as the Li-EMI-TFSA solution) at the volume ratio of 1:3, agitating the solution in methanol, and evaporating the methanol. EMI-TFSA is represented by the chemical formula (5) as shown below. The thickness of the solid electrolyte 4 was approximately 300 μm. As the fumed silica, 55130 manufactured by SIGMA-ALDRICH JAPAN was used. As Li, the reagent by SIGMA-ALDRICH JAPAN was used.

[Chemical formula 5]

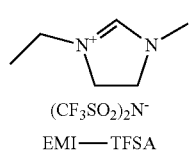

(CF$_3$SO$_2$)$_2$N$^-$
EMI——TFSA

Then the approximately 300 μm-thick paste material for the cathode body 3, mixed PEO film 36, and approximately 50-mg solid electrolyte were laminated in this order, compressed at 1 GPa by using the hard dice and the pressing machine to prepare a disk-shaped pellet, wherein the cathode body 3 was sealed, having diameter of 10 mm and thickness of approximately 1 mm.

As shown in FIG. 31(b), the Li-EMI-TFSA solution (15 μL) was dropped onto the solid electrolyte 4 of the pellet, which was left as it was at room temperature and in vacuum for 15 minutes for deaeration.

Then, as shown in FIG. 31(c), the 5 μL of EC/DEC and the 5 μL of 1 M LiClO$_4$ were added to the pellet. The thickness of the solid electrolyte 4 was approximately 300 to 400 μm.

The solid electrolyte 4 was thus made from fumed silica, Li-EMI-TFSA solution, EC/DEC, and LiClO$_4$. EMI-TFSA and EC/DEC were thus added to the solid electrolyte 4 as the ionic liquid.

Lastly, as shown in FIG. 31(d), on the surface on which cathode material paste and PEO thin film 36 were not laminated, the metallic Li, which functions as the anode body 5, was laminated and sealed in the coin cell in the atmosphere of Ar gas to fabricate the all-solid battery 40.

Figure 32:
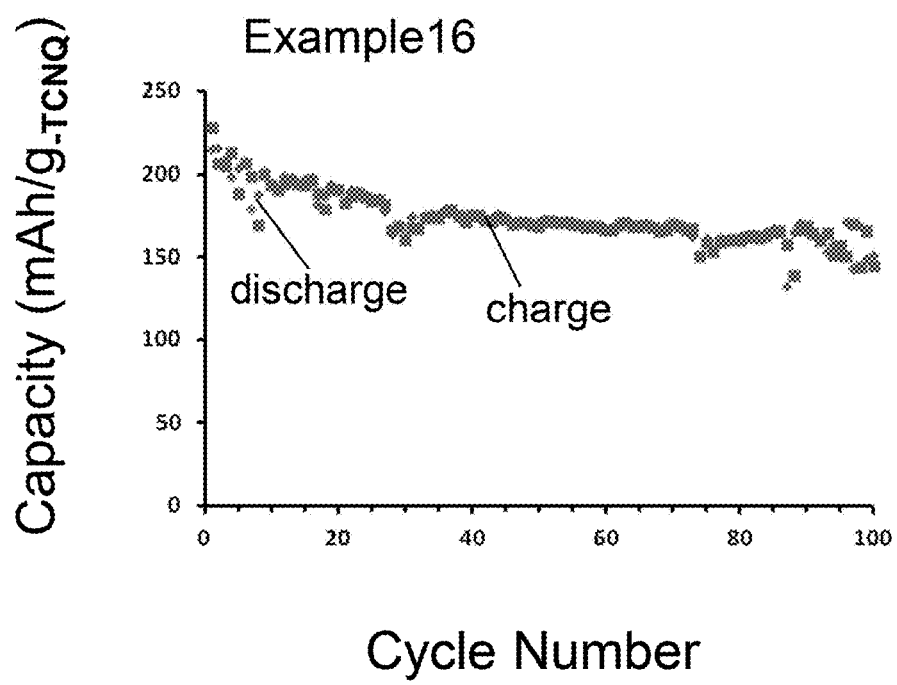
FIG. 32 is a chart showing the charging-discharging cycle characteristics in Example 16.

FIG. 32 is a chart showing the charging-discharging cycle characteristics in Example 16. The vertical axis represents capacity (mAh/g), and the horizontal axis represents cycle number. With the all-solid battery in Example 16, where TCNQ was used as the active material for the cathode body 3 and EC/DEC and 1-M LiClO$_4$ were added to the solid electrolyte 4, it was confirmed that charge-discharge can be performed 100 times or more at room temperature.

Figure 33:
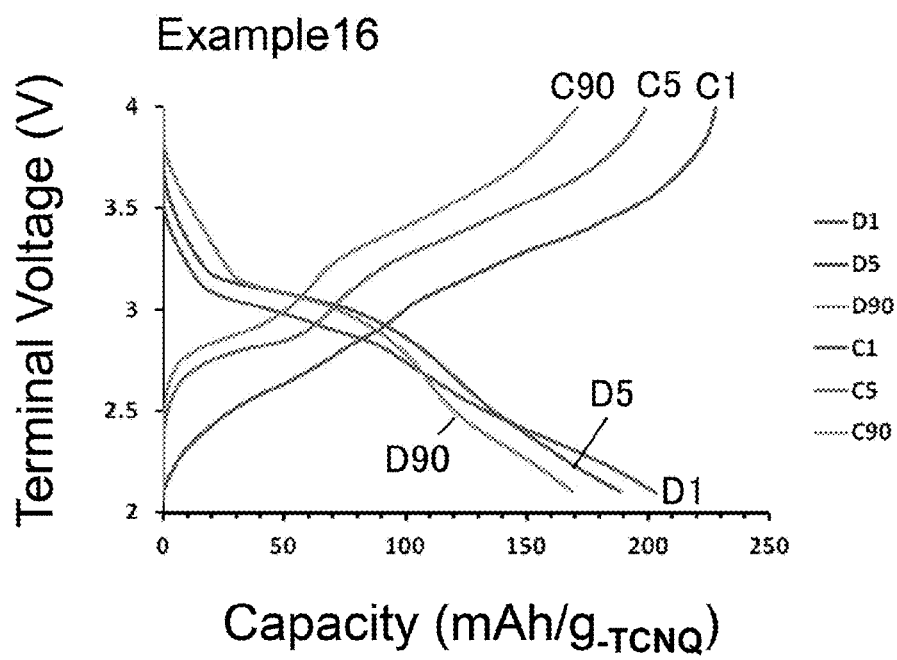
FIG. 33 is a chart showing the charging-discharging characteristics in Example 16.

FIG. 33 is a chart showing the charging-discharging characteristics in Example 16. The vertical axis represents voltage between terminals (V) and the horizontal axis represents specific capacitance (mAh/g). As shown in FIG. 33, the all-solid battery using TCNQ as the active material for the cathode body 3 in Example 16 had the initial charging capacity of 215.4 mAh/g-TCNQ at room temperature, which is accounted for more than 80% of the theoretical value of 262.5 mAh/g. The capacity in the 5th cycle was 203.6 mAh/g, that in the 90th cycle was 165.4 mAh/g, and the retention rate in the 100th cycle with respect to the initial value was found to be 70%.

Example 17

The all-solid battery in Example 17 was fabricated in the same manner as Example 16, except that the ratio by weight of the materials for the cathode body 3, namely TCNQ:AB:PTFE, was 88.7:6.6:4.7.

Figure 34:
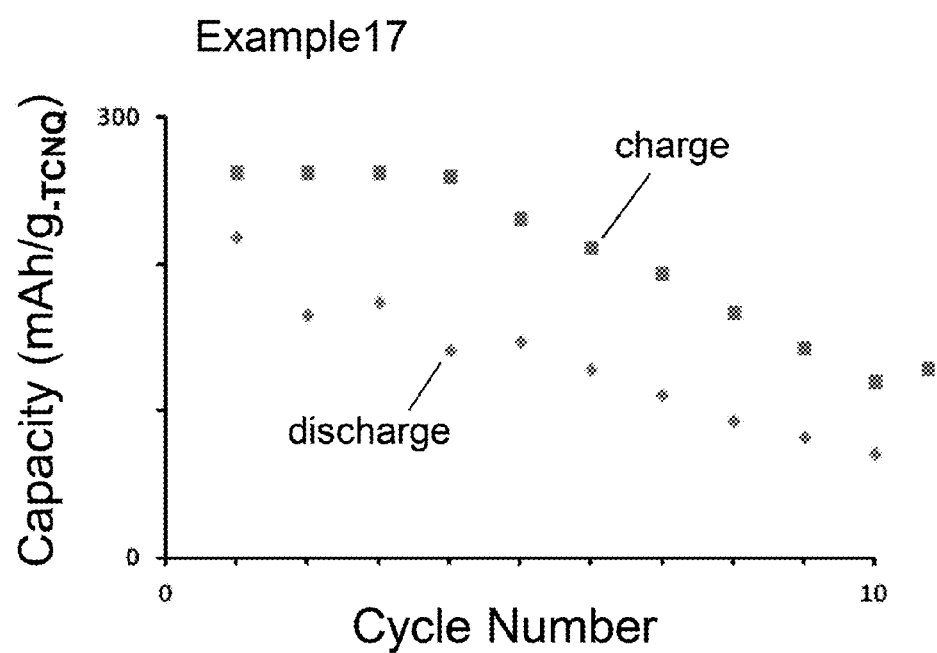
FIG. 34 is a chart showing the charging-discharging cycle characteristics in Example 17.

FIG. 34 is a chart showing the charging-discharging cycle characteristics in Example 17. The vertical and horizontal axes represent the same items as those in FIG. 32. The all-solid battery in Example 17, where TCNQ was used as the active material for the cathode body 3 and EC/DEC and 1-M LiClO$_4$ were added to the solid electrolyte 4, was found to allow charge-discharge to be performed 10 times or more at 50° C.

Figure 35:
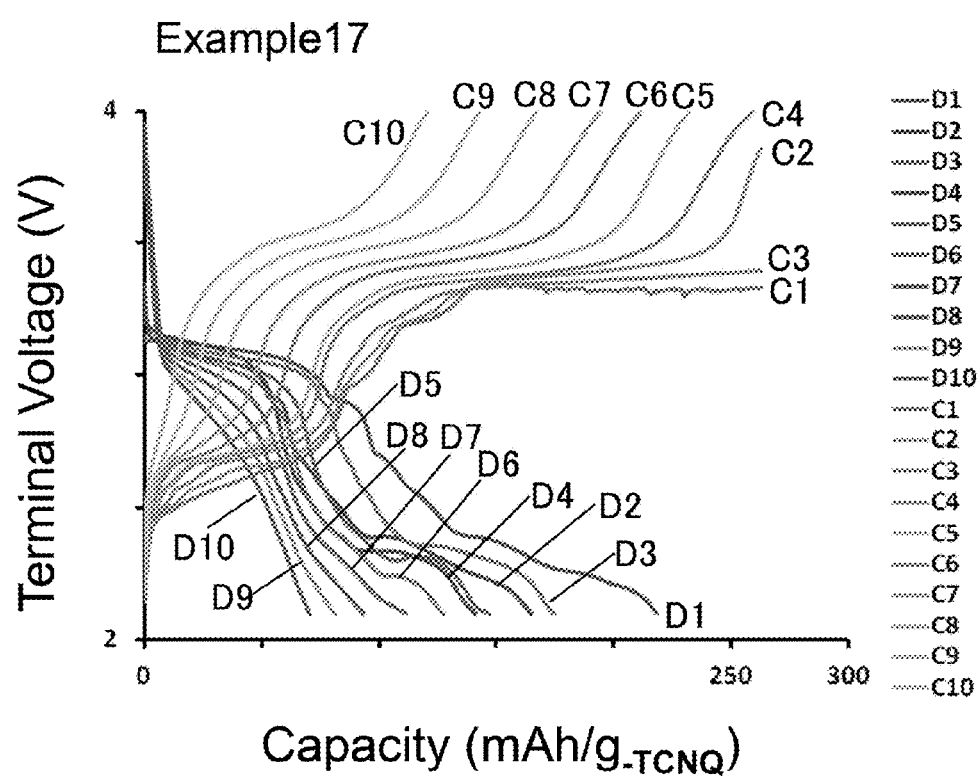
FIG. 35 is a chart showing the charging-discharging characteristics in Example 17.

FIG. 35 is a chart showing the charging-discharging characteristics in Example 17. The vertical and horizontal axes represent the same items as those in FIG. 33. As shown in FIG. 35, the charging-discharging characteristics of the all-solid battery in Example 17 were measured at 50° C. and at the rate of 0.2 C. The initial charging capacity was 218.4 mAh/g, and the capacity in the 5th cycle was 147.1 mAh/g, meaning that the retention rate was approximately 67%.

Example 18

The all-solid battery in Example 18 was fabricated in the same manner as Example 17, except that the ratio by weight of the materials for the cathode body 3, namely TCNQ:AB:PTFE, was 47.6:46.9:5.6.

Figure 36:
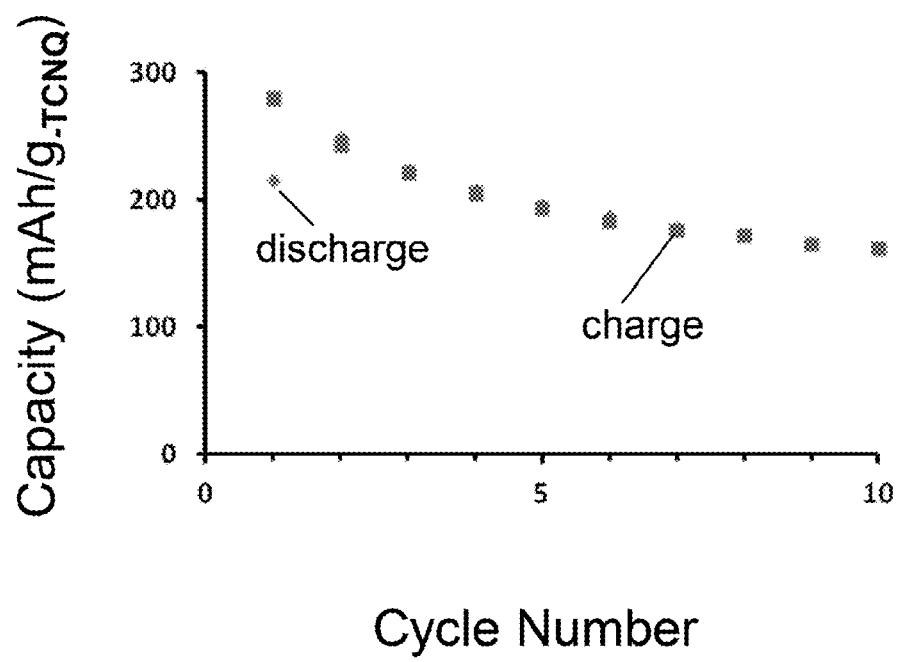
FIG. 36 is a chart showing the charging-discharging cycle characteristics in Example 18.

FIG. 36 is a chart showing the charging-discharging cycle characteristics in Example 18. The vertical and horizontal axes represent the same item as those in FIG. 32. The all-solid battery in Example 18, where TCNQ was used as the active material for the cathode body 3 and EC/DEC and 1-M LiClO$_4$ were added to the solid electrolyte 4, was found to allow charge-discharge to be performed 10 times or more at 50° C.

Figure 37:
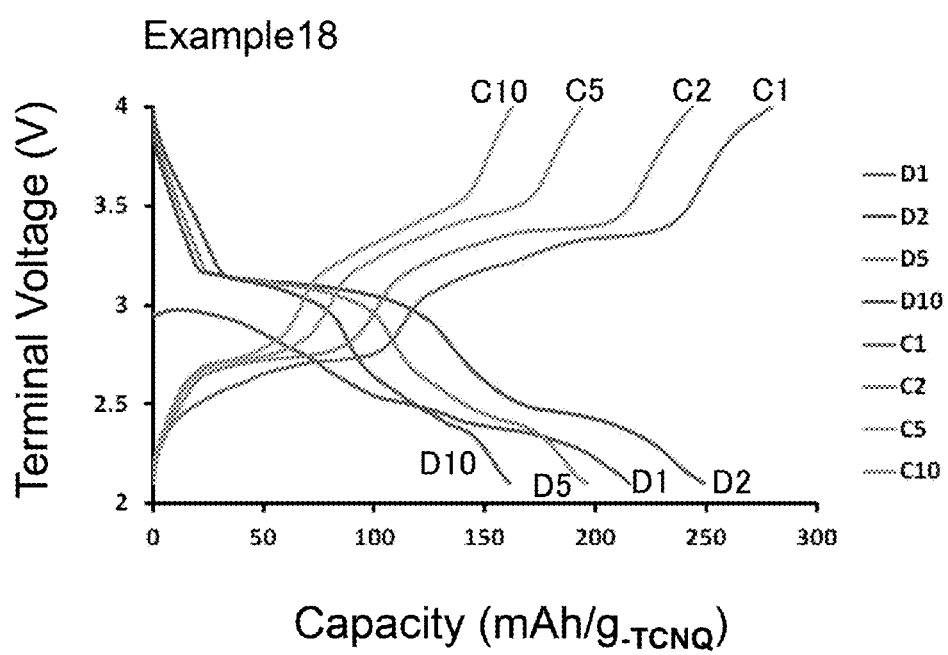
FIG. 37 is a chart showing the charging-discharging characteristics in Example 18.

FIG. 37 is a chart showing the charging-discharging characteristics in Example 18. The vertical and horizontal axes show the same item as those in FIG. 33. The charging-discharging characteristics were measured under the same condition as Example 17. As shown in FIG. 37, the initial charging capacity was 215.5 mAh/g, that in the 2nd cycle was 249.3 mAh/g, and that in the 5th cycle was 196.2 mAh/g.

Example 19

The all-solid battery in Example 19 was fabricated in the same manner as Example 17, except that the ratio by weight of the materials for the cathode body 3, namely TCNQ:AB:PTFE, was 29.1:65.3:5.6.

Figure 38:
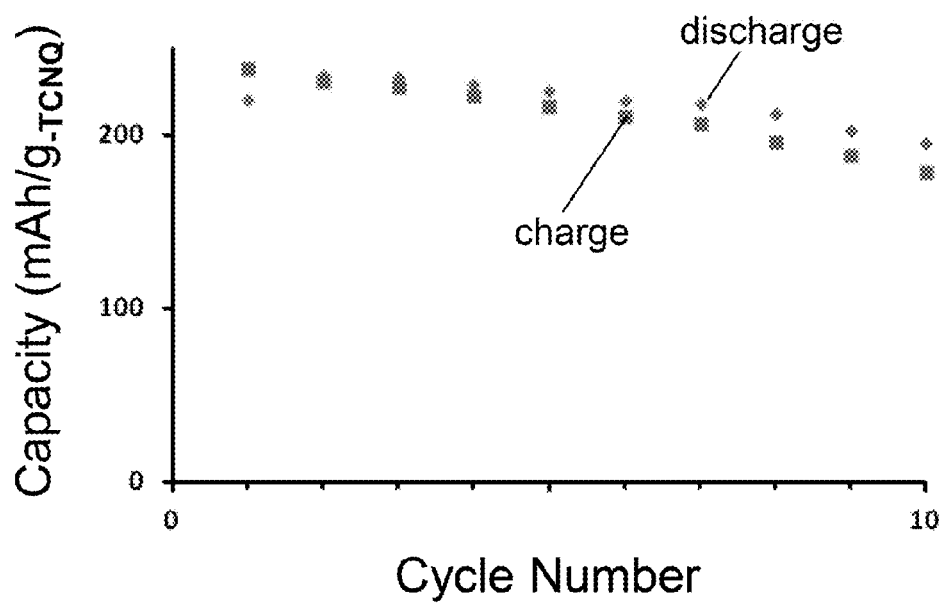
FIG. 38 is a chart showing the charging-discharging cycle characteristics in Example 19.

FIG. 38 is the chart showing the charging-discharging cycle characteristics in Example 19. The vertical and horizontal axes represent the same items as those in FIG. 32. The all-solid battery in Example 19, where TCNQ was used as the active material for the cathode body 3 and EC/DEC and 1-M LiClO$_4$ were added to the solid electrolyte 4, was found to allow charge-discharge to be performed 10 times or more at 50° C.

Figure 39:
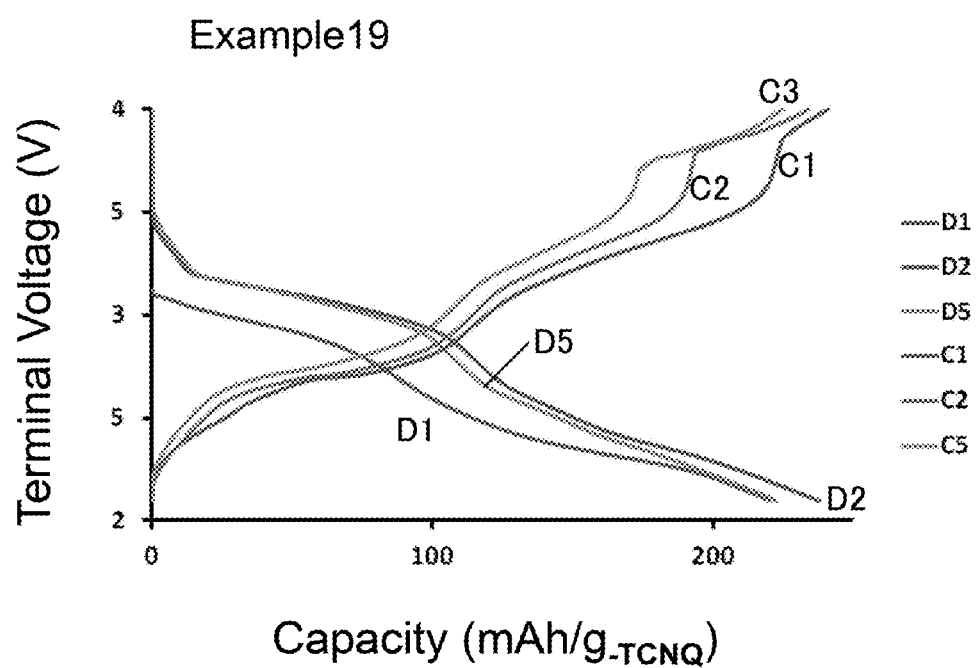
FIG. 39 is a chart showing the charging-discharging characteristics in Example 19.

FIG. 39 shows the charging-discharging characteristics in Example 19. The vertical and horizontal axes represent the same items as those in FIG. 33. As shown in FIG. 39, the charging-discharging characteristics were measured under the same condition as Example 17. The initial charging capacity was 220.3 mAh/g, the capacity in the second cycle was 234.0 mAh/g, and that in the 5th cycle was 224.9 mAh.

Example 20

The all-solid battery in Example 20 was fabricated in the same manner as Example 16, except that the ratio by weight of the materials for the cathode body 3, namely TCNQ:AB:PTFE, was 47.6:46.9:5.6, and that 1-methyl-2-butyl-pyrrolidinium bis(trifluoromethylsulfonyl)imide (commonly called BMP-TFSA) was used instead of EMI-TFSA to fabricate the cell. BMP-TFSA is represented by the chemical formula (6) as shown below. The solid electrolyte 4 was thus made from fumed silica, Li-BMP-TFSA solution, EC/DEC, and LiClO$_4$. BMP-TFSA and EC/DEC were thus added to the solid electrolyte 4 as the ionic liquid.

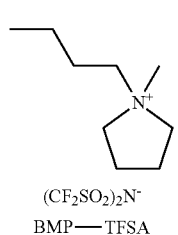

[Chemical formula 6]

$(CF_2SO_2)_2N^-$
BMP—TFSA

Figure 40:
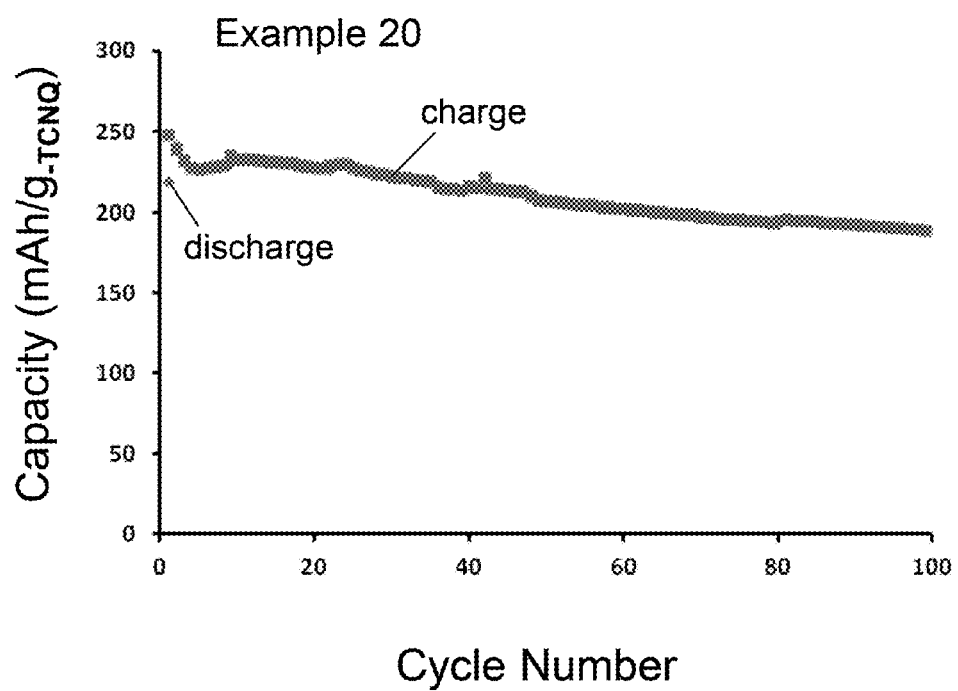
FIG. 40 is a chart showing the charging-discharging cycle characteristics in Example 20.

FIG. 40 is a chart showing the charging-discharging cycle characteristics in Example 20. The vertical and horizontal axes represent the same items as those in FIG. 32. The all-solid battery in Example 20, where TCNQ was used as the active material for the cathode body 3 and BMP was added to the solid electrolyte 4, was found to allow charge-discharge to be performed 100 times or more at 50° C.

Figure 41:
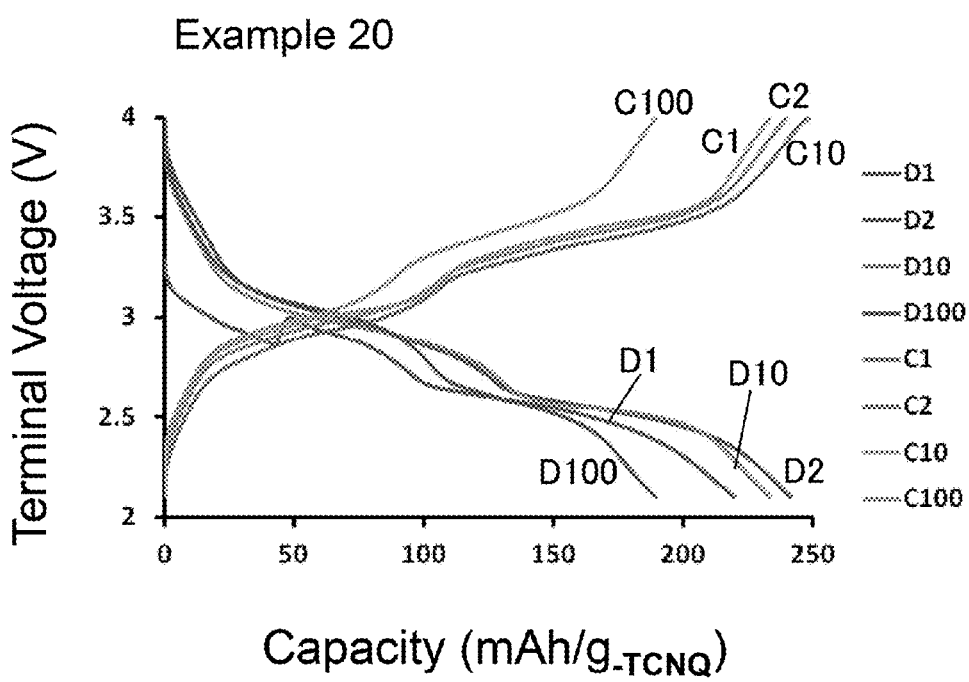
FIG. 41 is a chart showing the charging-discharging characteristics in Example 20.

FIG. 41 shows the charging-discharging characteristics in Example 20. The vertical and horizontal axes represent the same items as those in FIG. 33. As shown in FIG. 41, the charging-discharging characteristics were measured under the same condition as Example 17. The initial charging capacity was 219.8 mAh/g, the capacity in the 2nd cycle was 241.5 mAh/g, that in the 10th cycle was 233.5 mAh/g, and that in the 100th cycle was 189.1 mAh/g.

Example 21

The all-solid battery in Example 21 was fabricated in the same manner as Example 16, except that the ratio by weight of the materials for the cathode body 3, namely TCNQ:AB:PTFE, was 47.6:46.9:5.6, and that N-methyl-N-piperidinium bis(trifluoromethylsulfonyl)imide (commonly called PP13-TFSA) was used instead of EMI-TFSA to fabricate the cell. PP13-TFSA is represented by chemical formula (7) as shown below. The solid electrolyte 4 was thus made from fumed silica, Li-PP13-TFSA solution, EC/DEC, and LiClO$_4$. PP13-TFSA and EC/DEC were thus added to the solid electrolyte 4 as the ionic liquid.

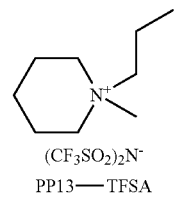

[[Chemical formula 7]]

$(CF_3SO_2)_2N^-$
PP13—TFSA

Figure 42:
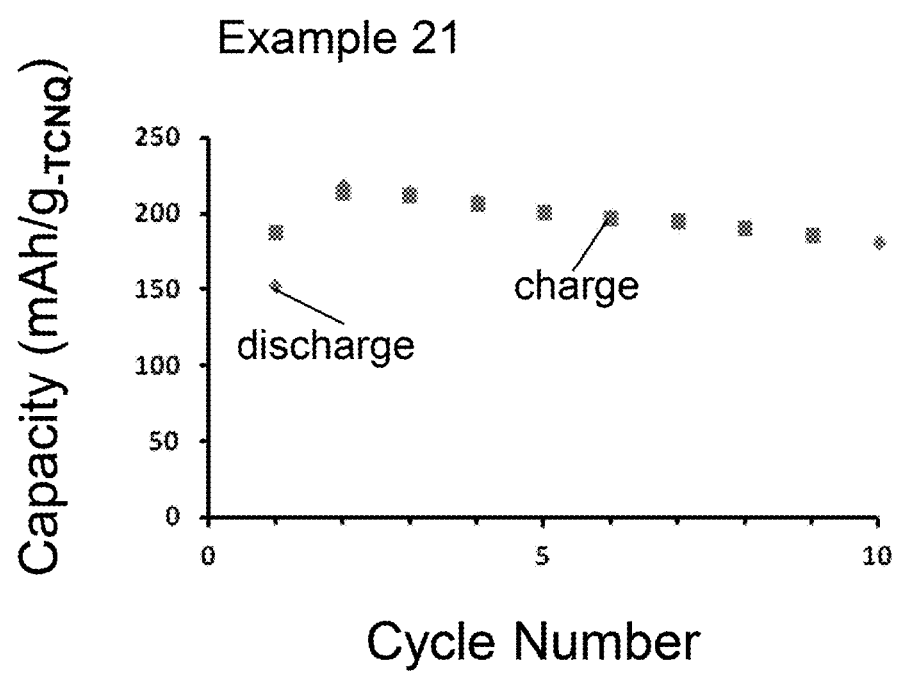
FIG. 42 is a chart showing the charging-discharging cycle characteristics in Example 21.

FIG. 42 shows the charging-discharging cycle characteristics in Example 21. The vertical and horizontal axes represent the same items as those in FIG. 32. The all-solid battery in Example 21, where TCNQ was used as the active material for the cathode body 3 and PP13 was added to the solid electrolyte 4, was found to allow charge-discharge to be performed 10 times or more at 50° C.

Figure 43:
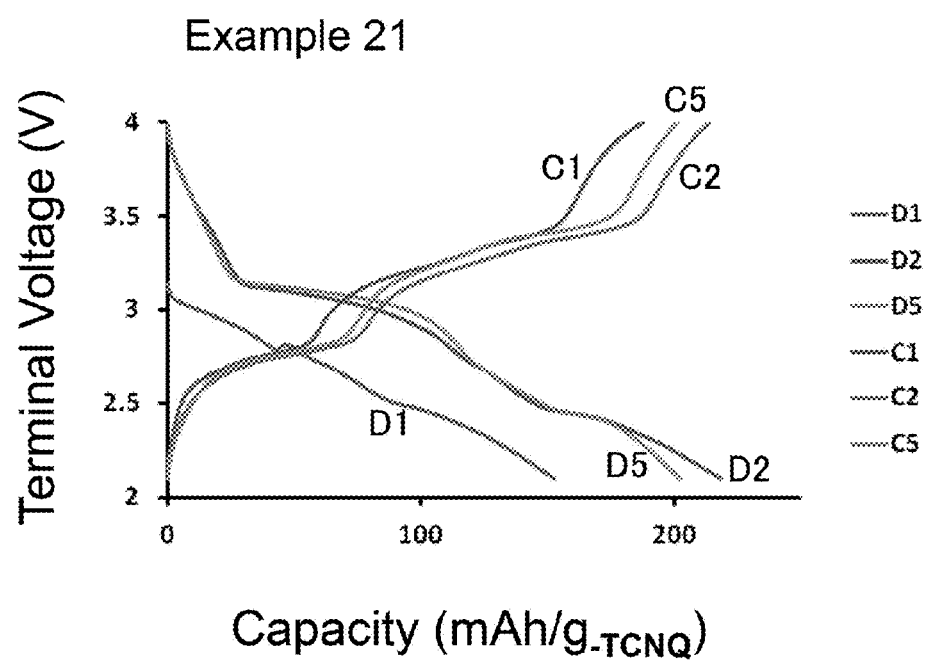
FIG. 43 is a chart showing the charging-discharging characteristics in Example 21.

FIG. 43 shows the charging-discharging characteristics in Example 21. The vertical and horizontal axes represent the same items as those in FIG. 33. As shown in FIG. 43, the charging-discharging characteristics were measured under the same condition as Example 17. The initial charging capacity was 152.7 mAh/g, the capacity in the 2nd cycle was 218.0 mAh/g, and that in the 5th cycle was 201.9 mAh/g.

Example 22

The all-solid battery in Example 22 was fabricated in the same manner as Example 16, except that the ratio by weight of the materials for the cathode body 3, namely TCNQ:AB:PTFE, was 47.6:46.9:5.6, and that N-diethyl-N-(2-methoxyethyl)-N-ammonium bis(trifluoromethylsulfonyl)imide (commonly called DEME-TFSA) was used instead of EMI-TFSA for the solid electrolyte. DEME-TFSA is represented by chemical formula (8) as shown below. The solid electrolyte 4 was thus made from fumed silica, Li-DEME-TFSA solution, EC/DEC, and LiClO$_4$. DEME-TFSA and EC/DEC were thus added to the solid electrolyte 4 as the ionic liquid.

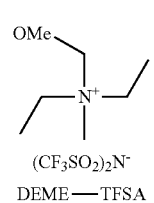

[Chemical formula 8]

$(CF_3SO_2)_2N^-$
DEME—TFSA

Figure 44:
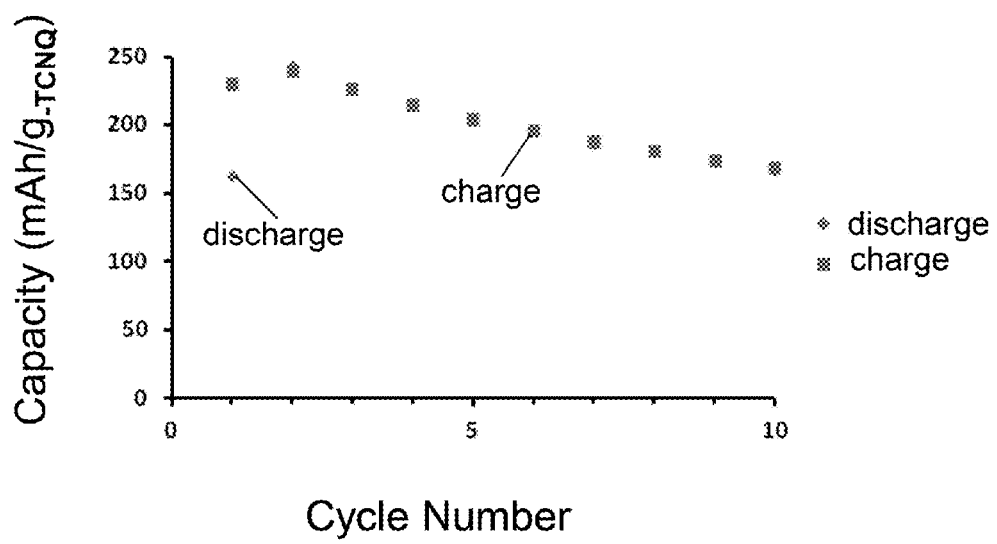
FIG. 44 is a chart showing the charging-discharging cycle characteristics in Example 22.

FIG. 44 is a chart showing the charging-discharging cycle characteristics in Example 22. The vertical and horizontal axes represent the same items as those in FIG. 32. The all-solid battery in Example 22, where TCNQ was used as the active material for the cathode body 3 and DEME was added to the solid electrolyte 4, was found to allow charge-discharge to be performed 10 times or more at 50° C.

Figure 45:
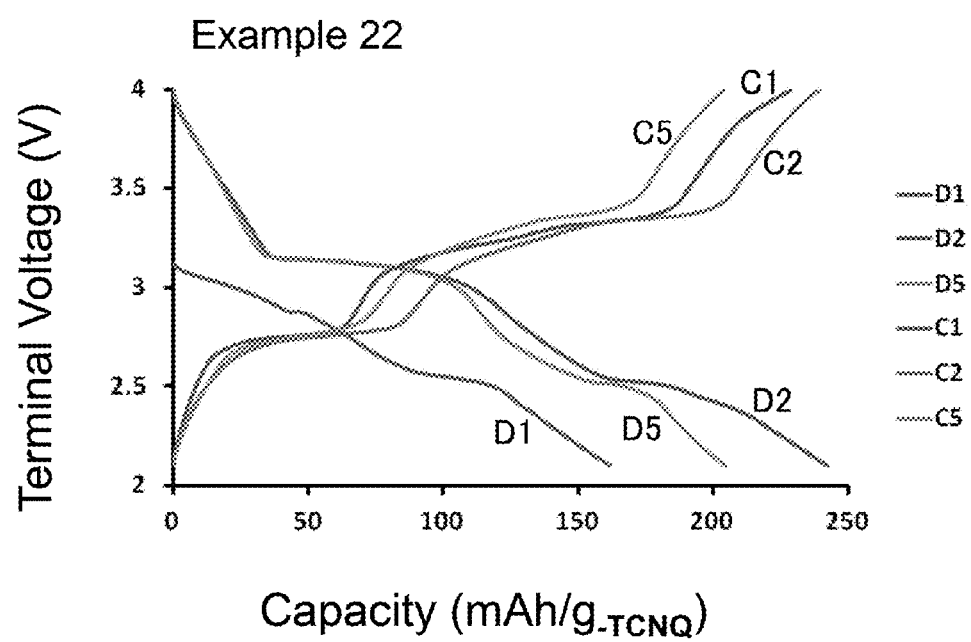
FIG. 45 is a chart showing the charging-discharging characteristics in Example 22.

FIG. 45 is a chart showing the charging-discharging characteristics in Example 22. The vertical and horizontal axes represent the same items as those in FIG. 33. As shown in FIG. 45, the charging-discharging characteristics were measured under the same condition as Example 17. The initial charging capacity was 162.2 mAh/g, the capacity in the 2nd cycle was 242.4 mAh/g, and that in the 5th cycle was 204.5 mAh/g.

Figure 46:
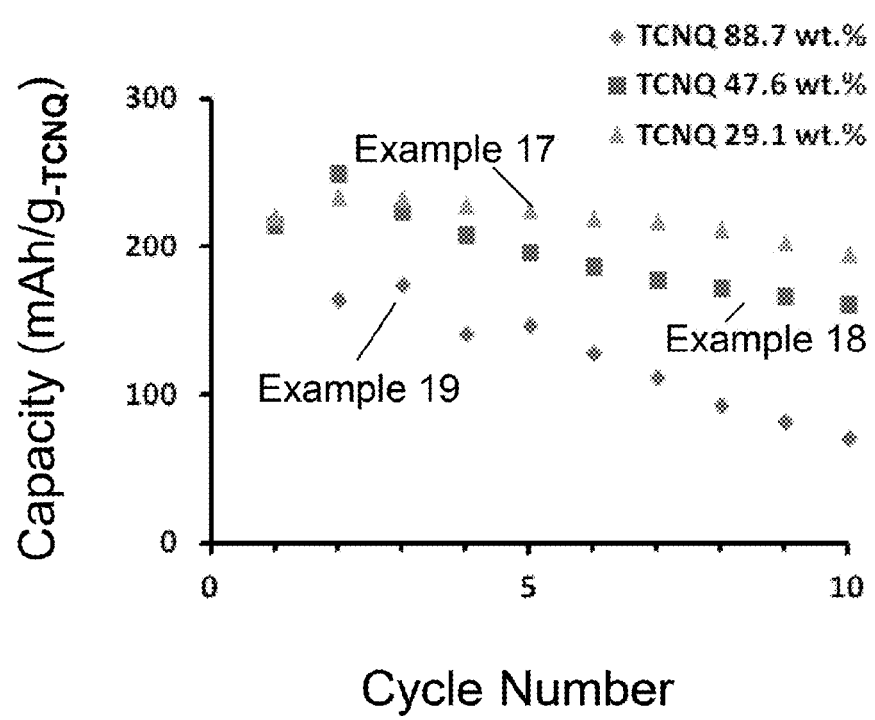
FIG. 46 is a chart showing the dependency of the charging-discharging cycle characteristics on the ratio by weight of TCNQ, the active material for the cathode body on in Examples 17, 18, and 19.

FIG. 46 is a chart showing the dependency of the charging-discharging cycle characteristics on the ratio by weight of TCNQ, the active material for the cathode body 3, in Examples 17, 18, and 19. The ratio by weight of TCNQ, active material for the cathode body 3, in Examples 17, 18, and 19 were 29.1%, 47.6%, and 88.7%, respectively. As shown in FIG. 46, the higher the ratio by weight of TCNQ, which is the active material for the cathode body 3, the greater the degradation in cycle characteristics, in particular in Example 19, where the ratio by weight exceeded 50%.

Figure 47:
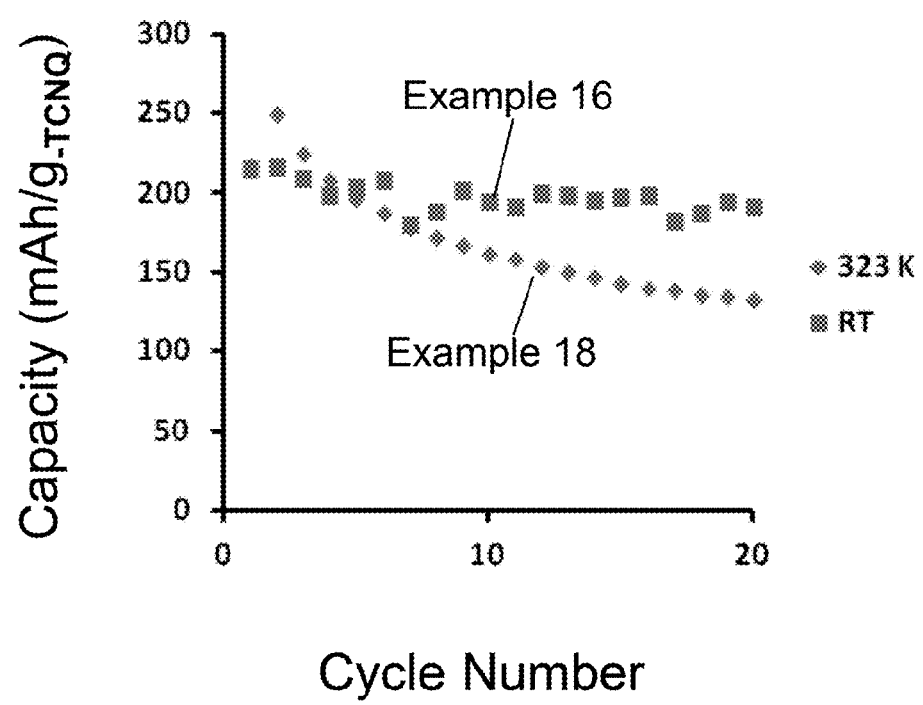
FIG. 47 is a chart showing the comparison in the dependency of the charging-discharging cycle characteristics on temperature in Examples 16 and 18.

FIG. 47 is a chart showing the comparison in the dependency of the charging-discharging cycle characteristics on temperature in Examples 16 and 18. The ratio by weight of TCNQ, the active material for the cathode 3, in Example 16 and that in Example 18 were approximately the same. Charge and discharge was performed at room temperature in Example 16, whereas it was performed at 50° C. in Example 18. As shown in FIG. 47, when the charging-discharging temperature was as high as 50° C. as in Example 18, the initial capacity was found to increase, but the cycle characteristics were found to decrease, compared to Example 16 where charge and discharge was performed at room temperature.

Figure 48:
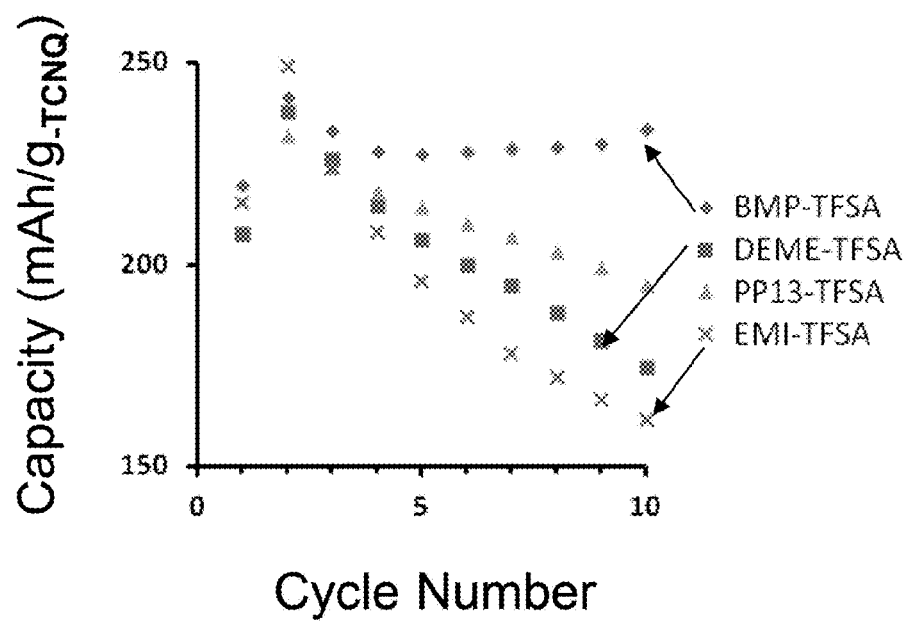
FIG. 48 is a chart comparing the charging-discharging cycle characteristics in Examples 18, 20, 21, and 22.

FIG. 48 is a chart comparing the charging-discharging cycle characteristics in Examples 18, 20, 21, and 22. Different organic electrolytes were added to the ionic liquid in Examples 18, 20, 21, and 22. Different organic electrolytes such as EMI etc. were added to the ionic liquid in Examples 18, 20, 21, and 22, EMI-TFSA, BMP-TFSA, PP13-TFSA, and DEME-TFSA being added, respectively.

As shown in FIG. 48, the battery performance, such as initial capacity and cycle characteristics, was found to be affected greatly by the type of ionic liquid contained in the solid electrolyte. When TCNQ was used as the active material, the all-solid battery containing Li ions as ionic liquid and using BMP-TFSA, or EMI-TFSA, and EC/DEC exhibited high cycle characteristics. The all-solid battery containing Li ions as the ionic liquid and using BMP-TFSA and EC/DEC exhibited the highest cycle characteristics.

Example 23

The all-solid battery in Example 23 was fabricated in the same manner as Example 16, except that the ratio by weight of the materials for the cathode body 3, namely TCNQ:KB:PTFE, was 46:49:3.6. The all-solid battery in Example 23 was confirmed to allow charge-discharge to be performed 100 times or more at room temperature as in Example 16, and under the charging and discharging condition of 0.2 C.

(Measurement 1 of Rapid Charging-Discharging Characteristics)

Then the rapid charging-discharging characteristics, namely high-speed charging-discharging characteristics, of the all-solid battery in Example 23 were examined. Charge and discharge were performed under the condition of 2 C, which was different from the condition in Example 16. The value 2 C is the full charging-full discharging rate at the current to reach the theoretical capacity in 30 minutes. Measurement was made at room temperature and at 50° C. (323 K).

Figure 49:
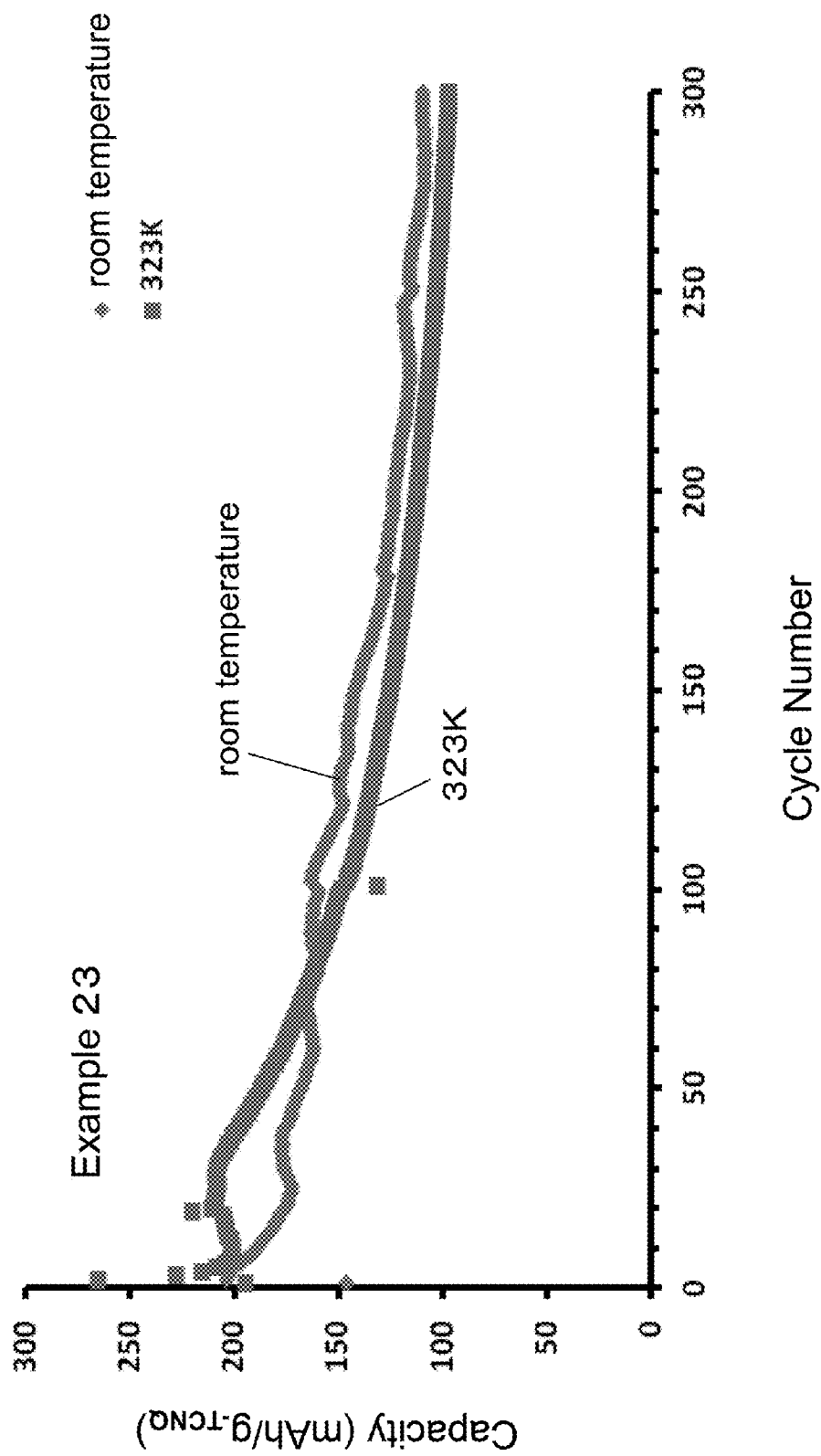
FIG. 49 is a chart showing the charging-discharging cycle characteristics in Example 23.

FIG. 49 is a chart showing the charging-discharging cycle characteristics in Example 23. The vertical axis represents capacity (mAh/g), and the horizontal axis represents cycle number. As shown in FIG. 49, the all-solid battery in Example 23 was found to allow charge and discharge to be performed 300 times or more at room temperature and at 50° C. and under the charging-discharging condition of 2 C.

Figure 50:
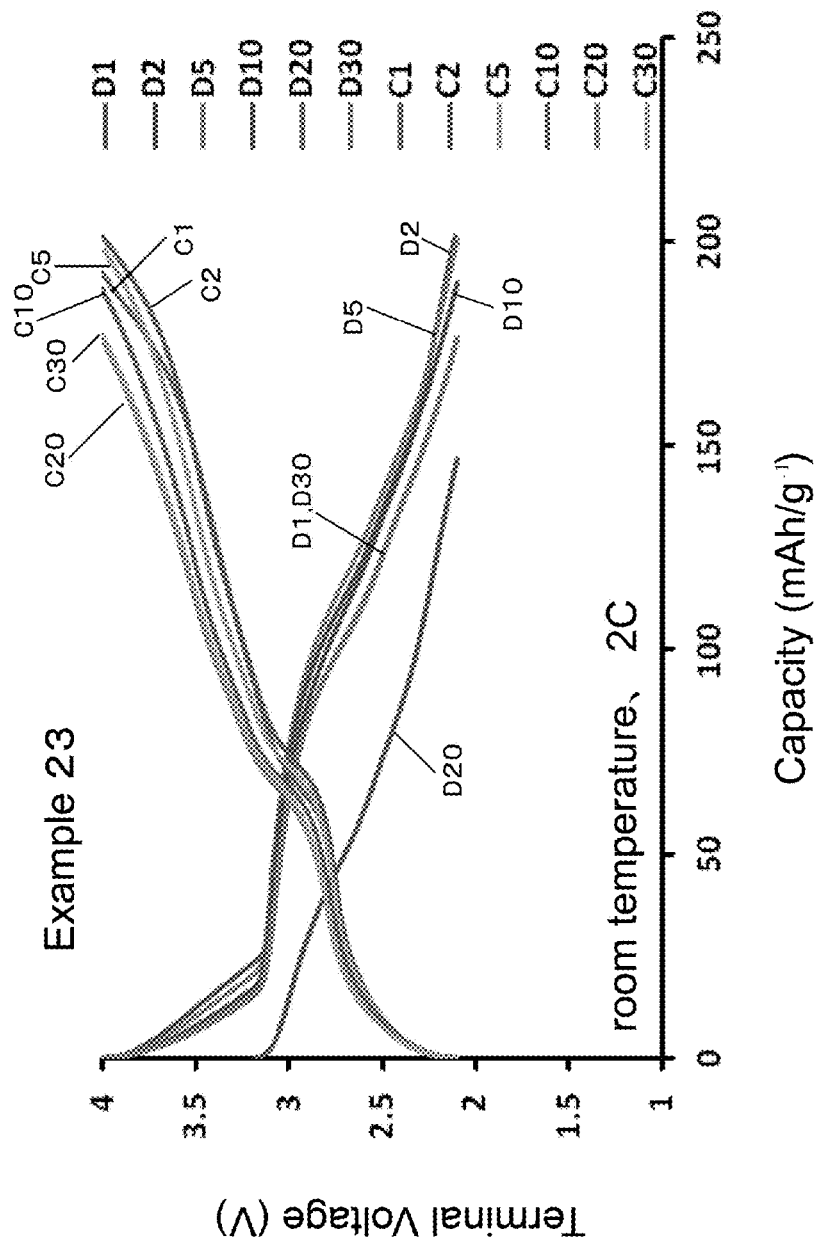
FIG. 50 is a chart showing the charging-discharging characteristics at room temperature in Example 23.

FIG. 50 is a chart showing the charging-discharging characteristics at room temperature in Example 23. The vertical axis represents the voltage between terminals (V) and the horizontal axis represents specific capacitance (mAh/g).

As shown in FIG. 50, with the all-solid battery using TCNQ as the active material for the cathode body 3 in Example 23, the initial charging capacity at room temperature was 200 mAh/g-TCNQ, which is accounted for 76% of the theoretical value of 262.5 mAh/g. The capacity in the 5th cycle was 197 mAh/g, that in the 30th cycle was 177 mAh/g, meaning that the retention rate in the 30th cycle with respect to the initial value was 89%. In the description 200 mAh/g-$_{TCN}$, the subscript g, i.e. TCNQ represents the active material for the cathode body 3.

Figure 51:
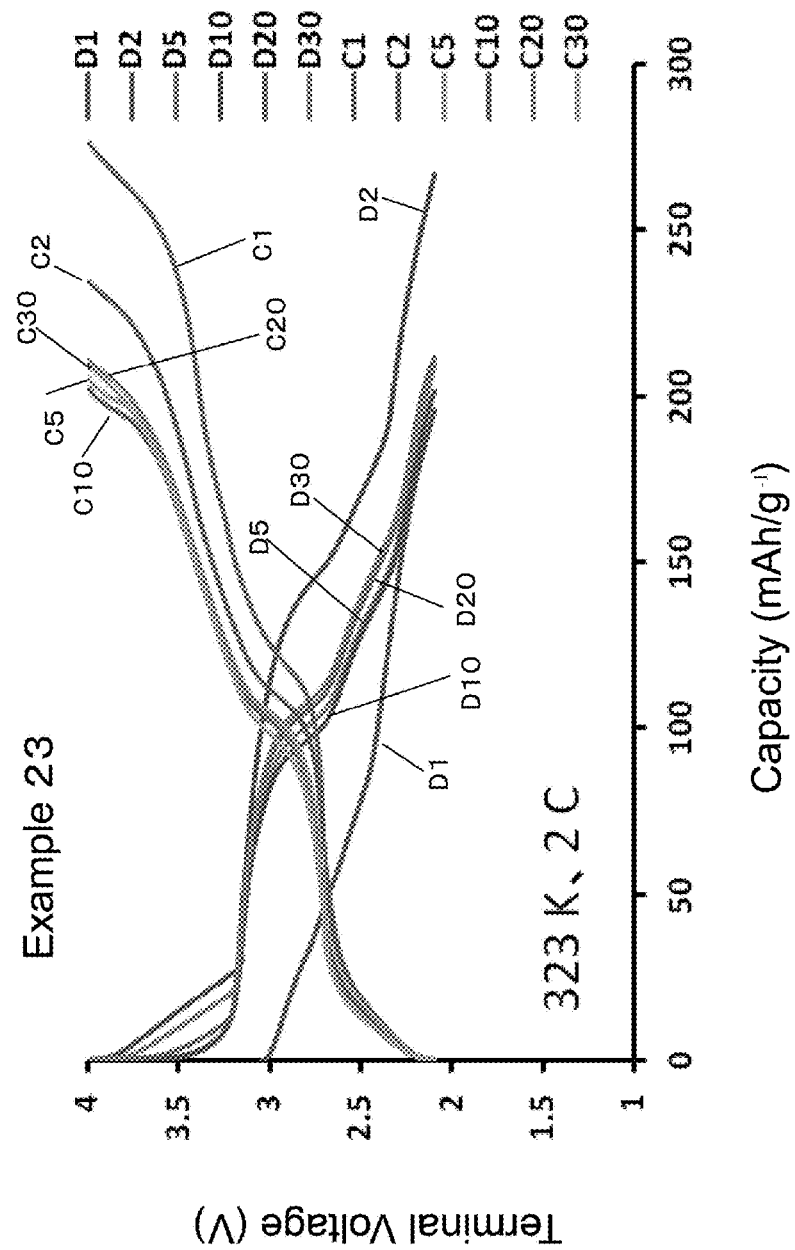
FIG. 51 is a chart showing the charging-discharging characteristics at 50° C. in Example 23.

FIG. 51 is a chart showing the charging-discharging characteristics at 50° C. in Example 23. The vertical and horizontal axes represent the same items as those in FIG. 50.

As shown in FIG. 51, with the all-solid battery using TCNQ as the active material for the cathode body 3 in Example 23, the initial charging capacity was 277 mAh/g-$_{TCNQ}$ at 50° C., which is accounted for more than 105% of the theoretical value of 262.5 mAh/g, the capacity in the 5th cycle was 206 mAh/g, that in the 30th cycle was 211 mAh/g, meaning that the retention rate in the 30th cycle with respect to the initial value was 76%.

(Measurement 2 of Rapid Charging-Discharging Characteristics)

Figure 52:
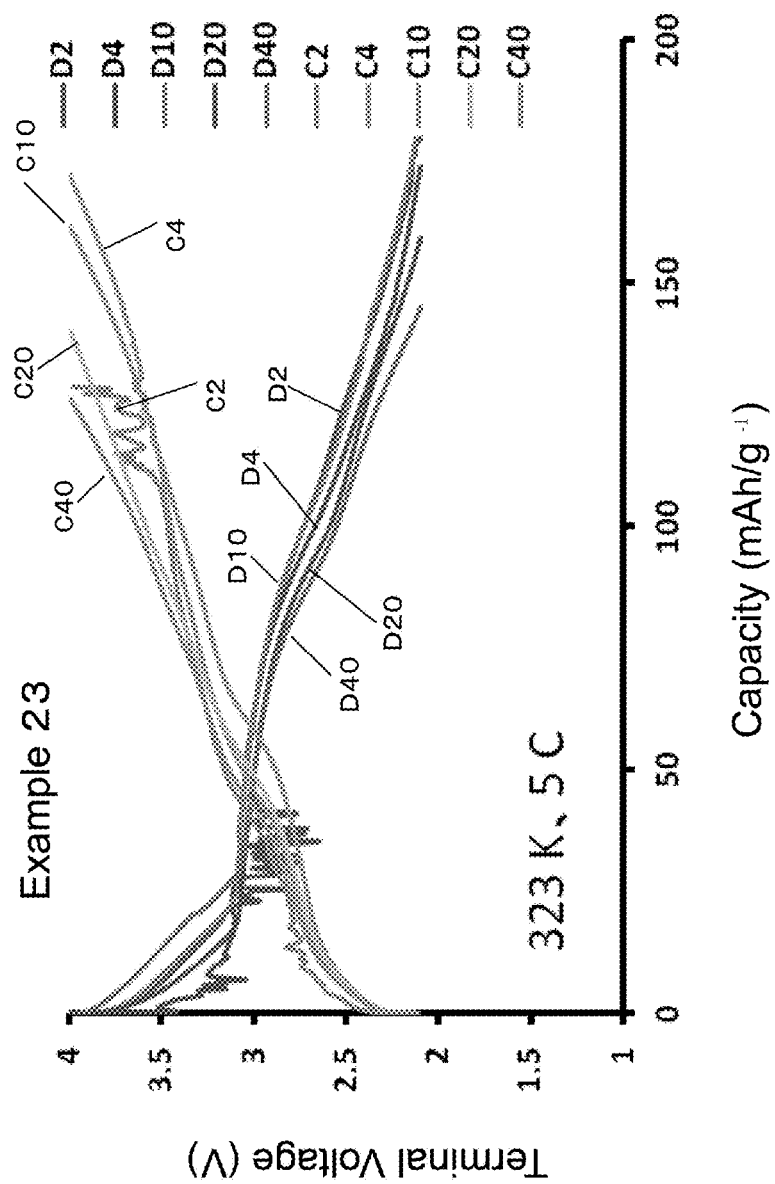
FIG. 52 is a chart showing the charging-discharging characteristics under the charging-discharging condition of 5 C at 50° C. in Example 23.

FIG. 52 is a chart showing the charging-discharging characteristics at 50° C. and under the charging-discharging condition of 5 C in Example 23. The vertical and horizontal axes represent the same items as those in FIG. 50. The value 5 C is the full charging-full discharging rate at the current to reach the theoretical capacity in 12 minutes. As shown in FIG. 52, with the all-solid battery using TCNQ as the active material for the cathode body 3 in Example 23, it was found that even at rapid charging-discharging rate of 5 C, the charge and discharge can be performed 100 times or more at 50°.

(Measurement 3 of Rapid Charging-Discharging Characteristics)

In Example 23, the charge and discharge was allowed under the charging-discharging condition even at 10 C both at room temperature and at 50° C. The value 10 C is the full charging-full discharging rate at the current to reach the theoretical capacity in 6 minutes. The initial charging capacity under the charging-discharging condition of 10 C at 50° C. was 72.0 mAh/g-$_{TCNQ}$.

Figure 53:
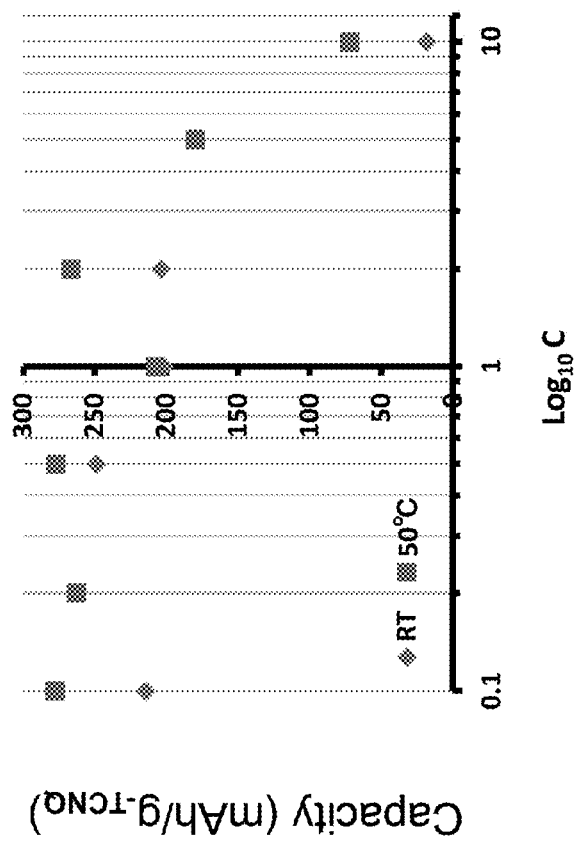
FIG. 53 is a chart showing the relation between charging-discharging rate (C) and the initial charging capacity in Example 23.

FIG. 53 is a chart showing the relation between the charging-discharging rate (C) and the initial charging capacity in Example 23. The vertical axis in FIG. 53 represents the initial charging capacity (mAh/g-$_{DDQ}$), and the horizontal axis represents the charging-discharging rate plotted in logarithm ($\text{Log}_{10}$ C).

As shown in FIG. 53, the initial charging capacity of 215 mAh/g-$_{DDQ}$ was obtained at 0.1 C when measurement was conducted at room temperature. Even if the charging-discharging rate (C) was changed from 0.1 C to 2 C, the initial capacity exhibited little change, and when the charging-discharging rate was changed from 2 C to 10 C, the initial charging capacity tended to decrease. When the measurement temperature was 50° C., the initial charging capacity of approximately 270 mAh/g-$_{DDQ}$ was obtained at 0.1 C. Even if the charging-discharging rate was changed from 0.1 C to 2 C, the initial charging capacity exhibited little change, and when the rate was changed from 2 C to 10 C, the initial charging capacity tended to decrease also as in the case where measurement was made at room temperature.

Example 24

The all-solid battery in Example 24 was fabricated in the same manner as Example 16, except that DDQ was used as the active material and that the ratio by weight of the materials for the cathode body 3, namely DDQ:KB:PTFE, was 67.1:26.9:6.0. The values 0.2 C, 0.5 C, 1 C, and 2 C, respectively represent the rate of full charge-full discharge at the current to reach the theoretical capacity in 5 hours, 2 hours, 1 hour, and 30 minutes.

(Measurement 4 of Rapid Charging-Discharging Characteristics)

Then the rapid charging-discharging characteristics, namely high-speed charging-discharging characteristics, of the all-solid battery in Example 24 were examined. The charge and discharge were performed under the condition of 0.2 C, 0.5 C, 1 C, and 2 C. Measurement was conducted at room temperature and at 50° C. (323K).

Figure 54:
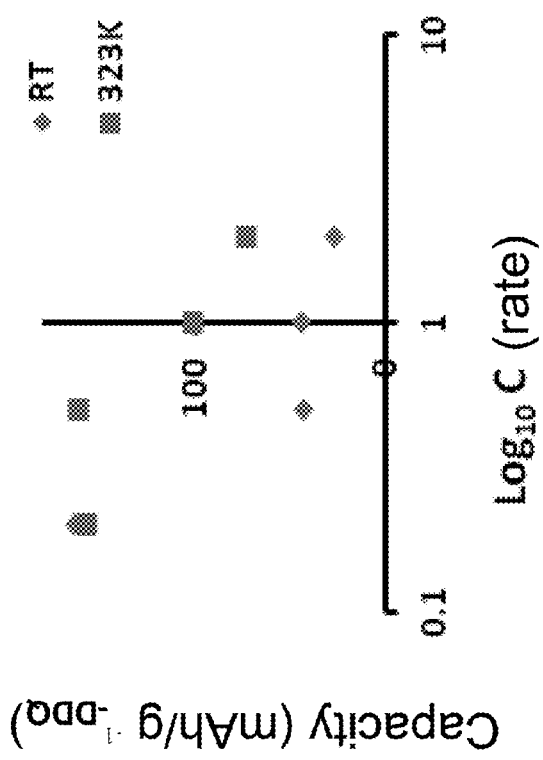
FIG. 54 is a chart showing the relation between charging-discharging rate (C) and the initial charging-discharging capacity in Example 24.

FIG. 54 is a chart showing the relation between the charging-discharging rate (C) and the initial charging capacity in Example 24. The vertical axis represents the initial charging capacity (mAh/g-$_{DDQ}$), and the horizontal axis represents the charging-discharging rate plotted in logarithm ($Log_{10}$ C).

As shown in FIG. 54, when the measurement was made at room temperature, the initial charging capacity was 160 mAh/g-$_{DDQ}$ at 0.2 C, and when the charging-discharging rate (C) was changed from 0.2 C to 0.5 C and up to 2 C, the initial charging capacity decreased. It was found that when the measurement temperature was 50° C., the initial charging capacity of 150 mAh/g-$_{DDQ}$ was obtained at 0.2 C and 0.5 C, and that when the charging-discharging rate (C) was changed from 0.5 C to 1 C and to 2 C, the initial charging capacity decreased gradually.

Figure 55:
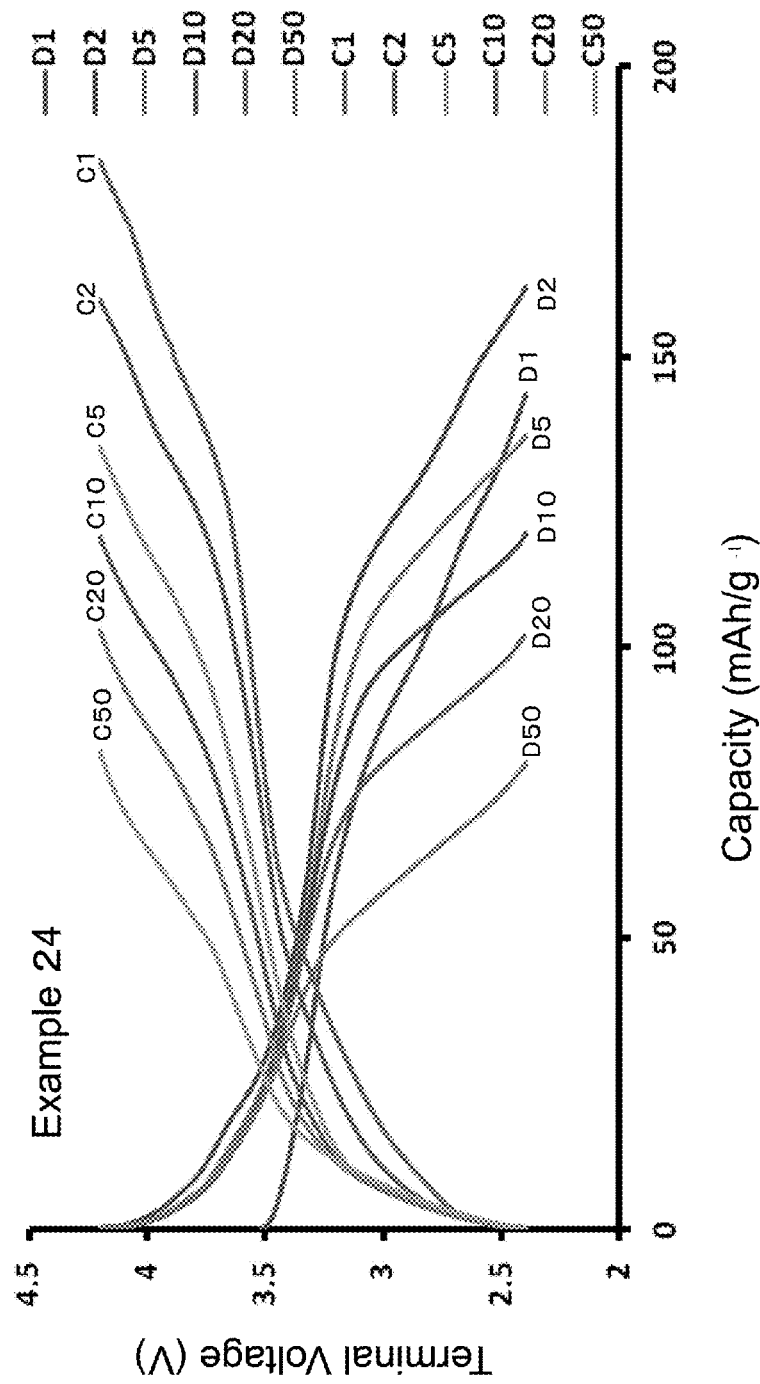
FIG. 55 is a chart showing the charging-discharging characteristics in Example 24.

FIG. 55 is a chart showing the charging-discharging characteristics in Example 24. The vertical and horizontal axes represent the same items as those in FIG. 50. The charging-discharging characteristics were measured under the condition of 50° C. and the charging-discharging rate (C) of 0.5 C.

As shown in FIG. 55, with the all-solid battery using DDQ as the active material for the cathode body 3 in Example 24, the initial charging capacity was 143.4 mAh/g, the capacity in the 2nd cycle was 161.7 mAh/g, and that in the 5th cycle was 136.2 mAh/g.

The present invention is not limited to the examples described above, but various modifications are allowed within the scope of the claims of the present invention. Needless to say, they are all included in the scope of the present invention.

What is claimed is:

1. A secondary battery comprising:
    a cathode collector;
    a cathode body;
    a solid electrolyte containing a supporting agent;
    an anode body;
    an anode collector; and
    a polymeric layer inserted between the cathode body and the solid electrolyte,
    wherein the cathode body is sealed by the polymeric layer and the cathode collector.
2. The secondary battery as set forth in claim 1, wherein the cathode body contains an active material that undergoes phase transition from a solid to a liquid, or to a phase containing a liquid, due to charge and discharge.
3. The secondary battery as set forth in claim 2, wherein the active material is any one of at least one of organic molecule that includes a quinone material, or a mixture of sulfur and at least one of organic molecule that includes the quinone material, and a mixture of sulfur and polyaniline.
4. The secondary battery as set forth in claim 2, wherein the active material is any one of TCNQ, THBQ, DDQ, rubeanic acid, a mixture of DDQ and FeAA, a mixture of DDQ and TCNQ, and a mixture of TCNQ and sulfur.
5. The secondary battery as set forth in claim 1, wherein the cathode body contains a liquid active material.
6. The secondary battery as set forth in claim 1, wherein the polymeric layer is made of a material different from the supporting agent.
7. The secondary battery as set forth in claim 1, wherein the solid electrolyte has lithium (Li) ion conductivity.
8. The secondary battery as set forth in claim 1, wherein the solid electrolyte comprises the supporting agent and an ionic liquid containing lithium (Li) ions.
9. The secondary battery as set forth in claim 8, wherein the ionic liquid is any one of TFSA, FSA, molten salt, organic electrolyte, and aqueous electrolyte, or is made of two or more of these substances.
10. The secondary battery as set forth in claim 9, wherein the organic electrolyte is any one of EC, DEC, and PC, or made of two or more of these substances.
11. The secondary battery as set forth in claim 8, wherein the ionic liquid is EMI-TFSA or BMP-TFSA.
12. The secondary battery as set forth in claim 8, wherein the supporting agent is metal oxide particles of any one of SiO2, ZrO2, Al2O3, TiO2, CeO2, Li3PO4, and LiLaTiO3.
13. The secondary battery as set forth in claim 1, wherein the solid electrolyte further contains a liquid electrolyte layer.
14. The secondary battery as set forth in claim 1, wherein the anode body is any one of carbon (C), lithium (Li), sodium (Na), magnesium (Mg), calcium (Ca), aluminum (Al), zinc (Zn), indium (In), tin (Sn), and silicon (Si).
15. The secondary battery as set forth in claim 1, wherein the cathode collector; the cathode body the polymeric layer; the solid electrolyte; the anode body; and the anode collector are laminated in this order.
16. The secondary battery as set forth in claim 1, wherein the polymeric layer has the ion conductivity.
17. The secondary battery as set forth in claim 1, wherein the polymeric layer is any one of polyethylene oxide (PEO), polyethylene glycol (PEG), polyvinyl alcohol (PVA), polycarbonate and is a mixture of two or more of these substances.
18. The secondary battery as set forth in claim 17, wherein the polymeric layer is a mixed PEO film having two different molecular weight of PEO.
19. A secondary battery comprising:
    a cathode collector;
    a cathode body;
    a solid electrolyte containing a supporting agent;
    an anode body;
    an anode collector; and
    a polymeric layer inserted between the cathode body and the solid electrolyte,
    wherein the cathode body is sealed by the polymeric layer and the cathode collector and wherein the cathode body contains an active material that undergoes phase transition from a solid to a liquid, or to a phase containing a liquid, due to charge and discharge.

20. The secondary battery as set forth in claim 19, wherein the cathode body contains a liquid active material.

21. The secondary battery as set forth in claim 20, wherein the active material is any one of at least one of organic molecule that includes a quinone material, a mixture of sulfur and at least one of organic molecule that includes the quinone material, and a mixture of sulfur and polyaniline.

22. The secondary battery as set forth in claim 19, wherein the polymeric layer is made of a material different from the supporting agent.

23. The secondary battery as set forth in claim 19, wherein the solid electrolyte has lithium (Li) ion conductivity.

24. The secondary battery as set forth in claim 19, wherein the solid electrolyte comprises the supporting agent and an ionic liquid containing lithium (Li) ions.

25. The secondary battery as set forth in claim 24, wherein the ionic liquid is any one of TFSA, FSA, molten salt, organic electrolyte, and aqueous electrolyte, or is made of two or more of these substances.

26. The secondary battery as set forth in claim 25, wherein the organic electrolyte is any one of EC, DEC, and PC, or is made of two or more of these substances.

27. The secondary battery as set forth in claim 24, wherein the ionic liquid is EMI-TFSA or BMP-TFSA.

28. The secondary battery as set forth in claim 24, wherein the supporting agent is metal oxide particles of any one of $SiO_2$, $ZrO_2$, $Al_2O_3$, $TiO_2$, $CeO_2$, $Li_3PO_4$, and $LiLaTiO_3$.

29. The secondary battery as set forth in claim 19, wherein the solid electrolyte further contains a liquid electrolyte layer.

30. The secondary battery as set forth in claim 19, wherein the active material is any one of TCNQ, THBQ, DDQ, rubeanic acid, a mixture of DDQ and FeAA, a mixture of DDQ and TCNQ, and a mixture of TCNQ and sulfur.

31. The secondary battery as set forth in claim 19, wherein the anode body is any one of carbon (C), lithium (Li), sodium (Na), magnesium (Mg), calcium (Ca), aluminum (Al), zinc (Zn), indium (In), tin (Sn), and silicon (Si).

32. The secondary battery as set forth in claim 19, wherein the cathode collector; the cathode body; the polymeric layer; the solid electrolyte; the anode body; and the anode collector are laminated in this order.

33. The secondary battery as set forth in claim 19, wherein the polymeric layer has the ion conductivity.

34. The secondary battery as set forth in claim 19, wherein the polymeric layer is any one of polyethylene oxide (PEO), polyethylene glycol (PEG), polyvinyl alcohol (PVA), polycarbonate and is a mixture of two or more of these substances.

35. The secondary battery as set forth in claim 34, wherein the polymeric layer is a mixed PEO film having two different molecular weight of PEO.

* * * * *